US012477570B2

(12) United States Patent
Rudolf et al.

(10) Patent No.: US 12,477,570 B2
(45) Date of Patent: Nov. 18, 2025

(54) EARLY INDICATION FOR INITIAL ACCESS IN FULL-DUPLEX SYSTEMS

(71) Applicant: Samsung Electronics Co., Ltd., Suwon-si (KR)

(72) Inventors: Marian Rudolf, Longueuil (CA); Aristides Papasakellariou, Houston, TX (US); Carmela Cozzo, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 17/931,885

(22) Filed: Sep. 13, 2022

(65) Prior Publication Data

US 2023/0106194 A1 Apr. 6, 2023

Related U.S. Application Data

(60) Provisional application No. 63/248,847, filed on Sep. 27, 2021.

(51) Int. Cl.
*H04W 74/00* (2009.01)
*H04L 5/14* (2006.01)
(Continued)

(52) U.S. Cl.
CPC ..... *H04W 74/002* (2013.01); *H04W 74/0833* (2013.01); *H04L 5/14* (2013.01); *H04W 74/0836* (2024.01)

(58) Field of Classification Search
CPC .......... H04W 74/002; H04W 74/0833; H04W 74/0836; H04W 74/006; H04W 48/10; H04W 74/004; H04L 5/14; H04J 11/0069
See application file for complete search history.

(56) References Cited

U.S. PATENT DOCUMENTS

2021/0321413 A1   10/2021   Shin et al.
2023/0007701 A1*  1/2023   Laselva ............ H04W 36/0033
(Continued)

FOREIGN PATENT DOCUMENTS

WO    2020032634 A2   2/2020
WO    2021057928 A1   4/2021
(Continued)

OTHER PUBLICATIONS

Internataional Search Report and Written Opinion issued Jan. 12, 2023 regarding International Application No. PCT/KR2022/014424, 7 pages.
(Continued)

*Primary Examiner* — Jung H Park

(57) ABSTRACT

Methods and apparatuses for early indication for initial access in full-duplex systems. A method for operating a user equipment (UE) includes receiving a system information block (SIB1) including configuration information, identifying, based on the configuration information, a random access channel (RACH) configuration, and identifying, based on the configuration information, an early access indication associated with a full-duplex operation. The method further includes determining to use a first random access transmission configuration if a condition for the early access indication associated with the full-duplex operation is met or a second random access transmission configuration if the condition is not met and transmitting a random access message using the determined first or second random access transmission configuration.

20 Claims, 18 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2023/0422296 | A1* | 12/2023 | Feng | H04W 74/0833 |
| 2024/0187967 | A1* | 6/2024 | He | H04W 72/51 |
| 2024/0244668 | A1* | 7/2024 | Islam | H04L 5/16 |

FOREIGN PATENT DOCUMENTS

| | | | |
|---|---|---|---|
| WO | 2021092820 | A1 | 5/2021 |
| WO | 2021141527 | A1 | 7/2021 |

OTHER PUBLICATIONS

Ericsson, "RAN1 aspects for RAN2-led features for RedCap", 3GPP TSG-RAN WG1 Meeting #106-e, R1-2106567, Aug. 2021, 11 pages.

Sony, "Discussion on enhancements for idle/inactive-mode UE", 3GPP TSG RAN WG2 Meeting #115-e, R2-2108062, Aug. 2021, 5 pages.

"3rd Generation Partnership Project; Technical Specification Group Radio Access Network; NR; Physical channels and modulation (Release 16)", 3GPP TS 38.211 V16.6.0, Jun. 2021, 134 pages.

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"5G; NR; Radio Link Control (RLC) protocol specification (3GPP TS 38.322 version 16.2.0 Release 16)", ETSI TS 138 322 V16.2.0, Jan. 2021, 36 pages.

"5G; NR; Packet Data Convergence Protocol (PDCP) specification (3GPP TS 38.323 version 16.4.0 Release 16)", ETSI TS 138 323 V16.4.0, Sep. 2021, 43 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"5G; NR; Requirements for support of radio resource management (3GPP TS 38.133 version 16.8.0 Release 16)", ETSI TS 138 133 V16.8.0, Sep. 2021, 2886 pages.

"5G; Procedures for the 5G System (5GS) (3GPP TS 23.502 version 16.9.0 Release 16)", ETSI TS 123 502 V16.9.0, Jul. 2021, 617 pages.

"5G; Non-Access-Stratum (NAS) protocol for 5G System (5GS); Stage 3 (3GPP TS 24.501 version 16.9.0 Release 16) Technical Specification", ETSI TS 124 501 V16.9.0, Aug. 2021, 756 pages.

Extended European Search Report issued Jul. 1, 2025 regarding Application No. 22873242.6, 8 pages.

* cited by examiner

FIG. 8

EARLY INDICATION FOR INITIAL ACCESS IN FULL-DUPLEX SYSTEMS

CROSS-REFERENCE TO RELATED APPLICATION AND CLAIM OF PRIORITY

This application claims priority under 35 U.S.C. § 119(e) to U.S. Provisional Patent Application No. 63/248,847 filed on Sep. 27, 2021. The above-identified provisional patent application is hereby incorporated by reference in its entirety.

TECHNICAL FIELD

The present disclosure relates generally to wireless communication systems and, more specifically, the present disclosure relates to initial access procedures and, even more specifically, the present disclosure relates to early indication for initial access in full-duplex systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to early indication for initial access in full-duplex systems.

In one embodiment, a method is provided. The method includes receiving a system information block (SIB1) including configuration information, identifying, based on the configuration information, a random access channel (RACH) configuration, and identifying, based on the configuration information, an early access indication associated with a full-duplex operation. The method further includes determining to use a first random access transmission configuration if a condition for the early access indication associated with the full-duplex operation is met or a second random access transmission configuration if the condition is not met and transmitting a random access message using the determined first or second random access transmission configuration.

In another embodiment, a user equipment (UE) is provided. The UE includes a transceiver configured to receive a SIB1 including configuration information and a processor operably coupled to the transceiver. The processor is configured to identify, based on the configuration information, a RACH configuration; identify, based on the configuration information, an early access indication associated with a full-duplex operation; and determine to use a first random access transmission configuration if a condition for the early access indication associated with the full-duplex operation is met or a second random access transmission configuration if the condition is not met. The transceiver is further configured to transmit a random access message using the determined first or second random access transmission configuration.

In yet another embodiment, a base station (BS) is provided. The BS includes a transceiver configured to transmit a SIB1 including configuration information indicating a RACH configuration and an early access indication associated with a full-duplex operation and receive a random access message using a first or second random access reception configuration. The first random access reception configuration is used if a condition for the early access indication associated with the full-duplex operation is met and the second random access reception configuration is used if the condition is not met.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example diagram of a medium access control (MAC) subheader according to embodiments of the present disclosure;

DETAILED DESCRIPTION

Figure 1:
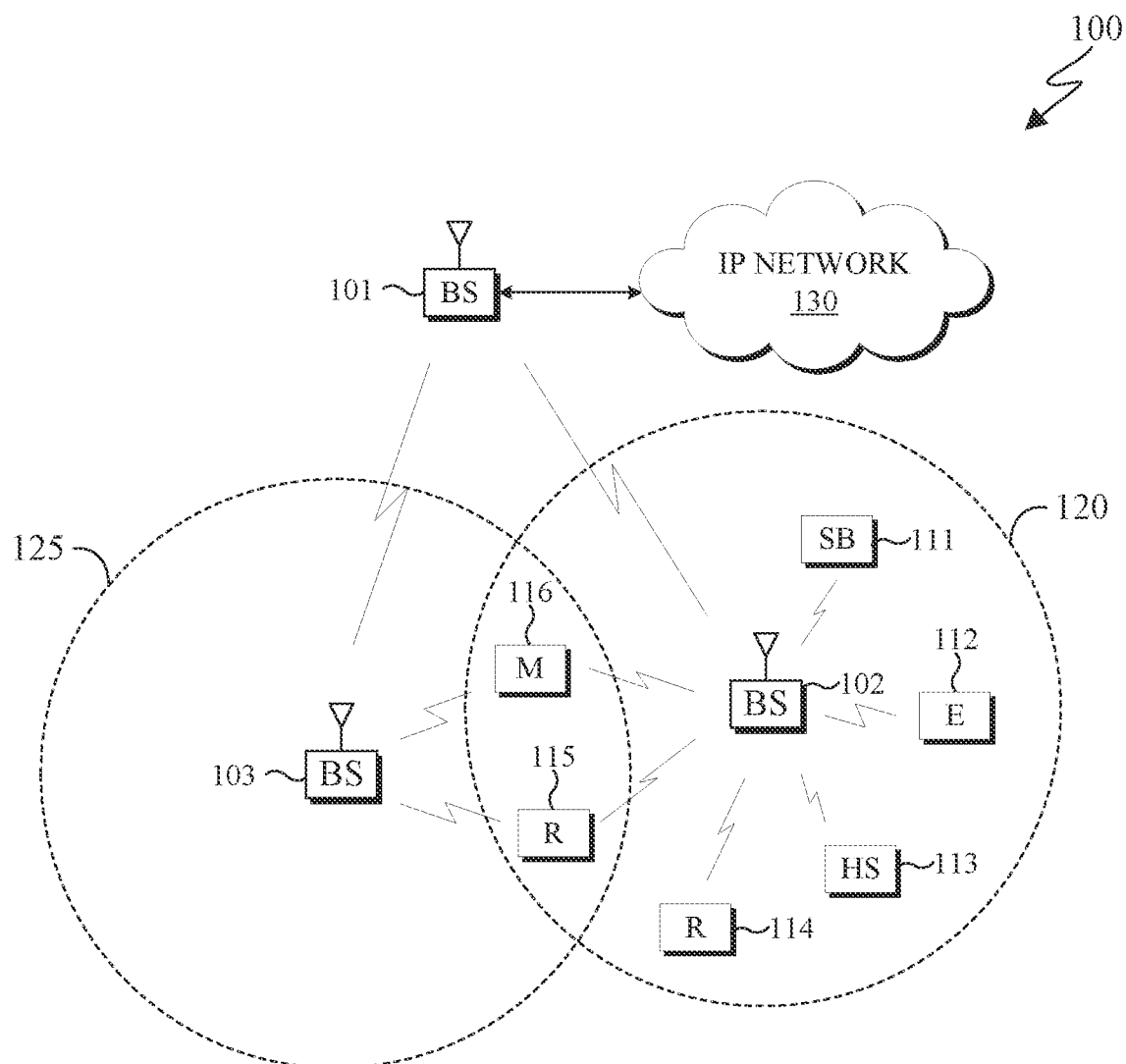
FIG. 1 illustrates an example wireless network according to embodiments of the present disclosure.

FIGS. 1 through 20, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.6.0, "NR; Physical channels and modulation" ("REF1"); 3GPP TS 38.212 v16.6.0, "NR; Multiplexing and Channel coding" ("REF2"); 3GPP TS 38.213 v16.6.0, "NR; Physical Layer Procedures for Control" ("REF3"); 3GPP TS 38.214 v16.6.0, "NR; Physical Layer Procedures for Data" ("REF4"); 3GPP TS 38.321 v16.5.0, "NR; Medium Access Control (MAC) protocol specification" ("REF5"); 3GPP TS 38.322 v16.2.0, "NR; Radio Link Control (RLC) protocol specification" ("REF6"); 3GPP TS 38.323 v16.4.0, "NR; Packet Data Convergence Protocol (PDCP) specification" ("REF7"); 3GPP TS 38.331 v16.5.0, "NR; Radio Resource Control (RRC) Protocol Specification" ("REF8"); 3GPP TS 38.133 v16.8.0, "NR; Requirements for support of radio resource management" ("REF9"); 3GPP TS 23.502 v16.9.0, "Procedures for the 5G System; Stage 2" ("REF10"); and 3GPP TS 24.501 v16.9.0, "Non-Access-Stratum (NAS) protocol for 5G System (5GS); Stage 3" ("REF11").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, vehicular (V2X) and device-to-device (D2D) communication, wireless backhaul, moving network, cooperative communication, coordinated multi-points (CoMP), reception-end interference cancelation, Multi-TRP transmission and reception (multi-TRP), cross-link interference (CLI) and remote interference (RIM) detection and avoidance, NR operation in unlicensed bands (NR-U), and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

5G radio supports flexible spectrum utilization from 400 MHz to 90 GHz for licensed, unlicensed, and shared spectrum bands, narrow-band and wideband allocations with bandwidth parts, carrier aggregation, dual-connectivity, and dynamic spectrum sharing, achieves higher spectrum occupancy than LTE, and utilizes flexible control channel assignments in time and frequency domains. In-built support since 3GPP Release 15 for massive MIMO and beamforming greatly enhances achievable coverage and spectral efficiency when using 5G radio. Flexible OFDM numerology, short transmission time and scheduling delays, self-contained slots, asynchronous hybrid automatic repeat request (HARQ), minimal overhead from DL common signals and channels, adaptive reference signals and low-density parity check (LDPC) and Polar channel coding enable more flexibility and faster processing with 5G radio when compared to LTE.

Figure 2:
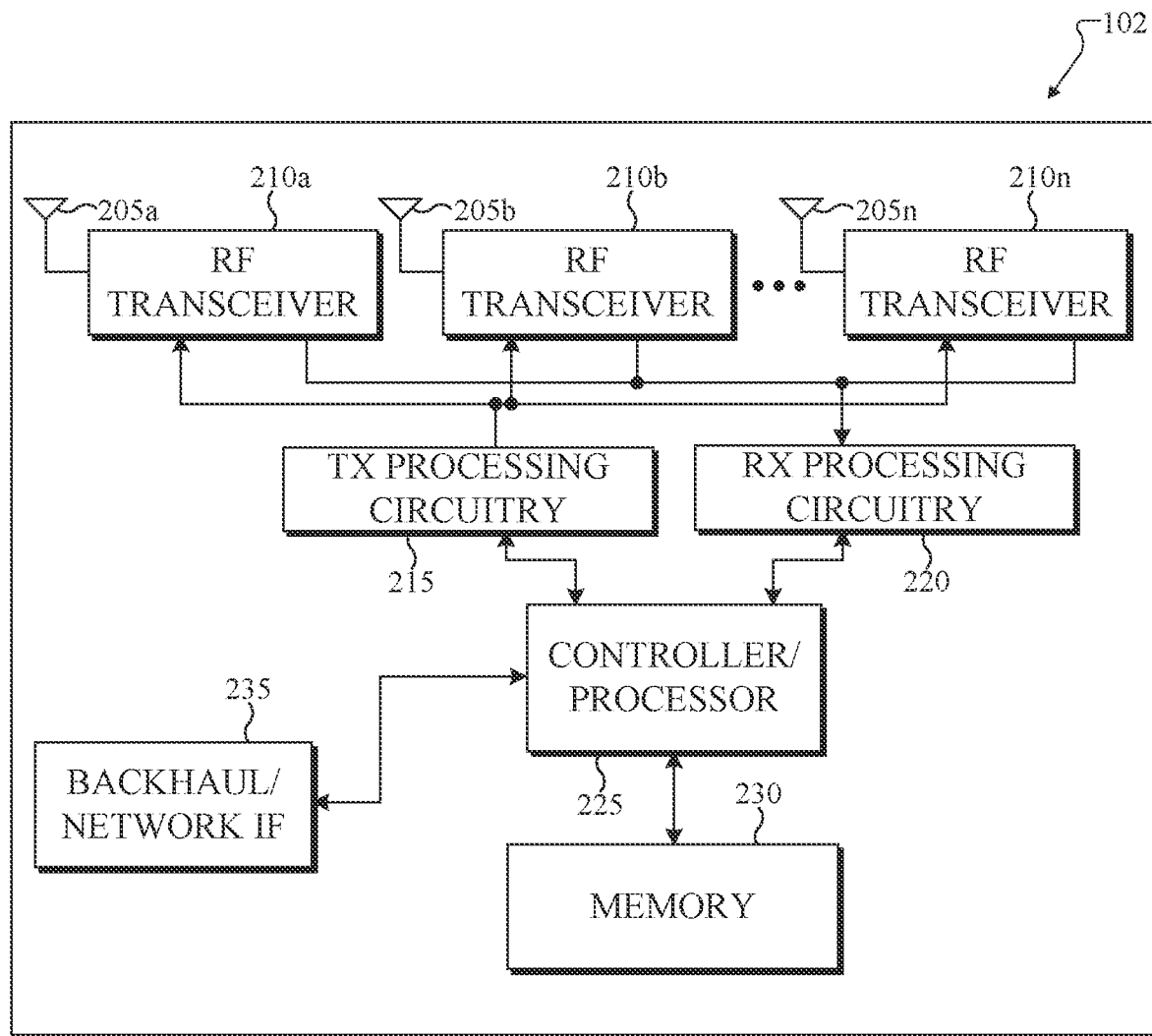
FIG. 2 illustrates an example BS according to embodiments of the present disclosure.
Figure 3:
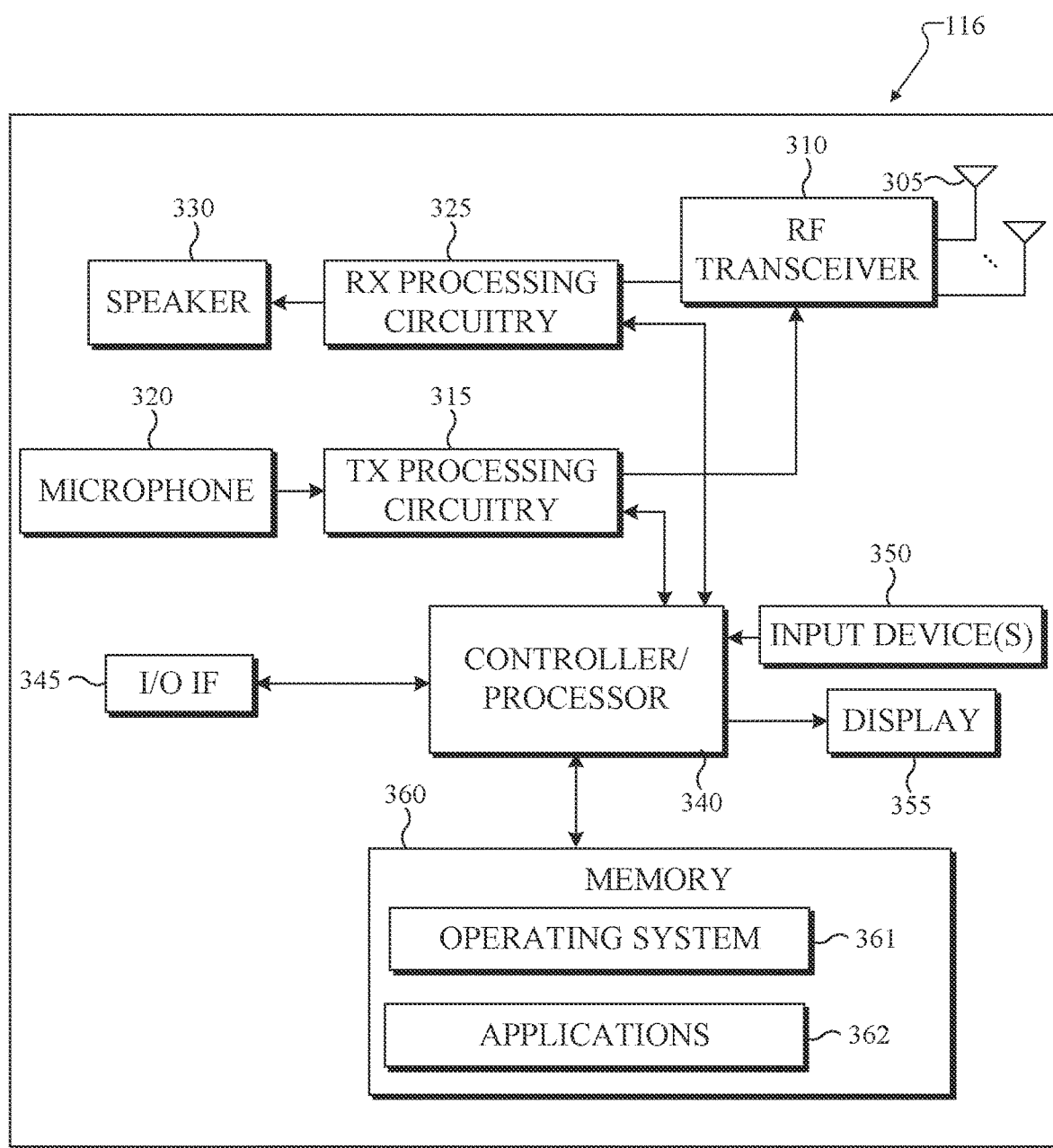
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for early indication for initial access in full-duplex systems. In certain embodiments, and one or more of the BSs 101-103 includes circuitry, programing, or a combination thereof for early indication for initial access in full-duplex systems.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support early indication for initial access in full-duplex systems. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

In the following, an italicized name for a parameter denotes a parameter provided by higher layers, such as by RRC or by a MAC control element (CE).

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

In certain embodiments, DL signals include data signals conveying information content, control signals conveying DL control information (DCI), and reference signals (RS) that are also known as pilot signals. A gNB (such as the BS 102) transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

In certain embodiments, a gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

In certain embodiments, a UE (such as the US 116) can determine CSI-RS transmission parameters through DL control signaling or higher layer signaling, such as RRC signaling, from a gNB. Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

Figure 4:
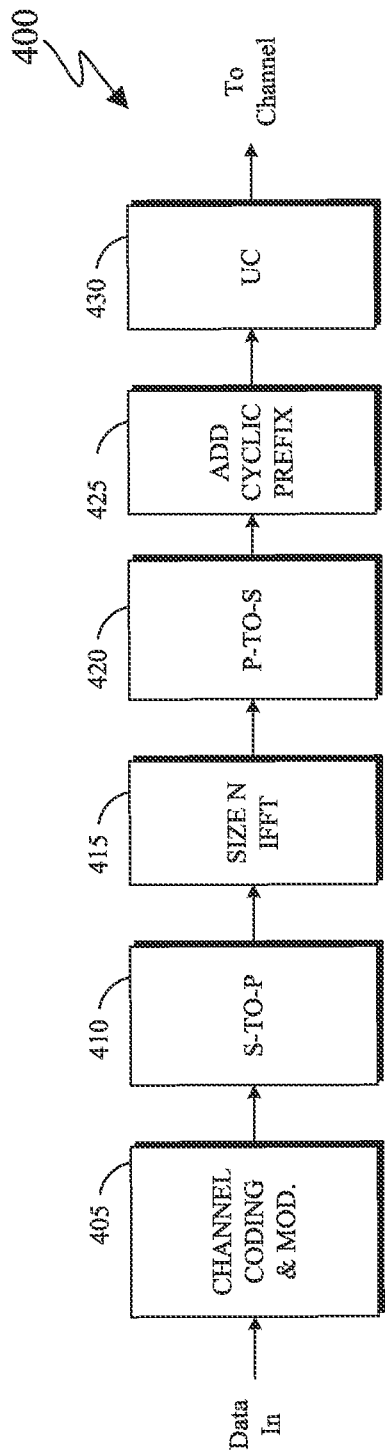
FIGS. 4 and 5 illustrate example wireless transmit and receive paths according to embodiments of the present disclosure.
Figure 5:
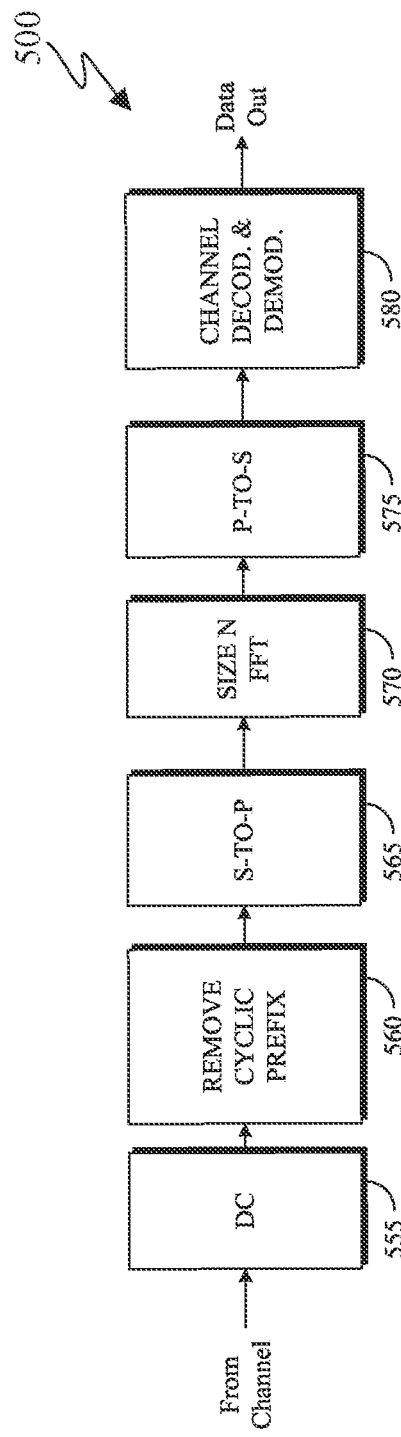

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support early indication for initial access in full-duplex systems as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as LDPC coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In certain embodiments, UL signals also include data signals conveying information content, control signals conveying UL control information (UCI), DM-RS associated with data or UCI demodulation, sounding RS (SRS) enabling a gNB to perform UL channel measurement, and a random access (RA) preamble enabling a UE to perform random access (see also NR specification). A UE transmits data information or UCI through a respective PUSCH or a physical UL control channel (PUCCH). A PUSCH or a PUCCH can be transmitted over a variable number of slot symbols including one slot symbol. The gNB can configure the UE to transmit signals on a cell within an active UL bandwidth part (BWP) of the cell UL BW.

In certain embodiments, UCI includes HARQ acknowledgement (HARQ-ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

In certain embodiments, a CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

In certain embodiments, UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a time division duplexing (TDD) system, an SRS transmission can also provide a PMI for DL transmission. Additionally, in order to establish synchronization or an initial higher layer connection with a gNB, a UE can transmit a physical random access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that synchronized signal (SS)/PBCH block (SSBs) transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same Code division multiplexing (CDM) group are quasi co-located with respect to Doppler shift, Doppler spread, average delay, delay spread, and spatial Rx. The UE may also assume that DM-RS ports associated with a PDSCH are quasi-collocated (QCL) with QCL type A, type D (when applicable) and average gain. The UE may further assume that no DM-RS collides with the SS/PBCH block.

In certain embodiments, the UE (such as the UE 116) can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DM-RS ports of the PDSCH, the DM-RS port of PDCCH or the CSI-RS port(s) of a CSI-RS resource.

In certain embodiments, the quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

In certain embodiments, the UE receives a MAC-CE activation command to map up to [N] (e.g., N=8) transmission configuration indication (TCI) states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $n+3N_{slot}^{subframe,\mu}$.

The following embodiments of the present disclosure describe a UE registering with a network to get authorized to receive services, to enable mobility tracking and to enable reachability. This is described in the following examples and embodiments, such as those of FIGS. 6 and 7.

Figure 6:
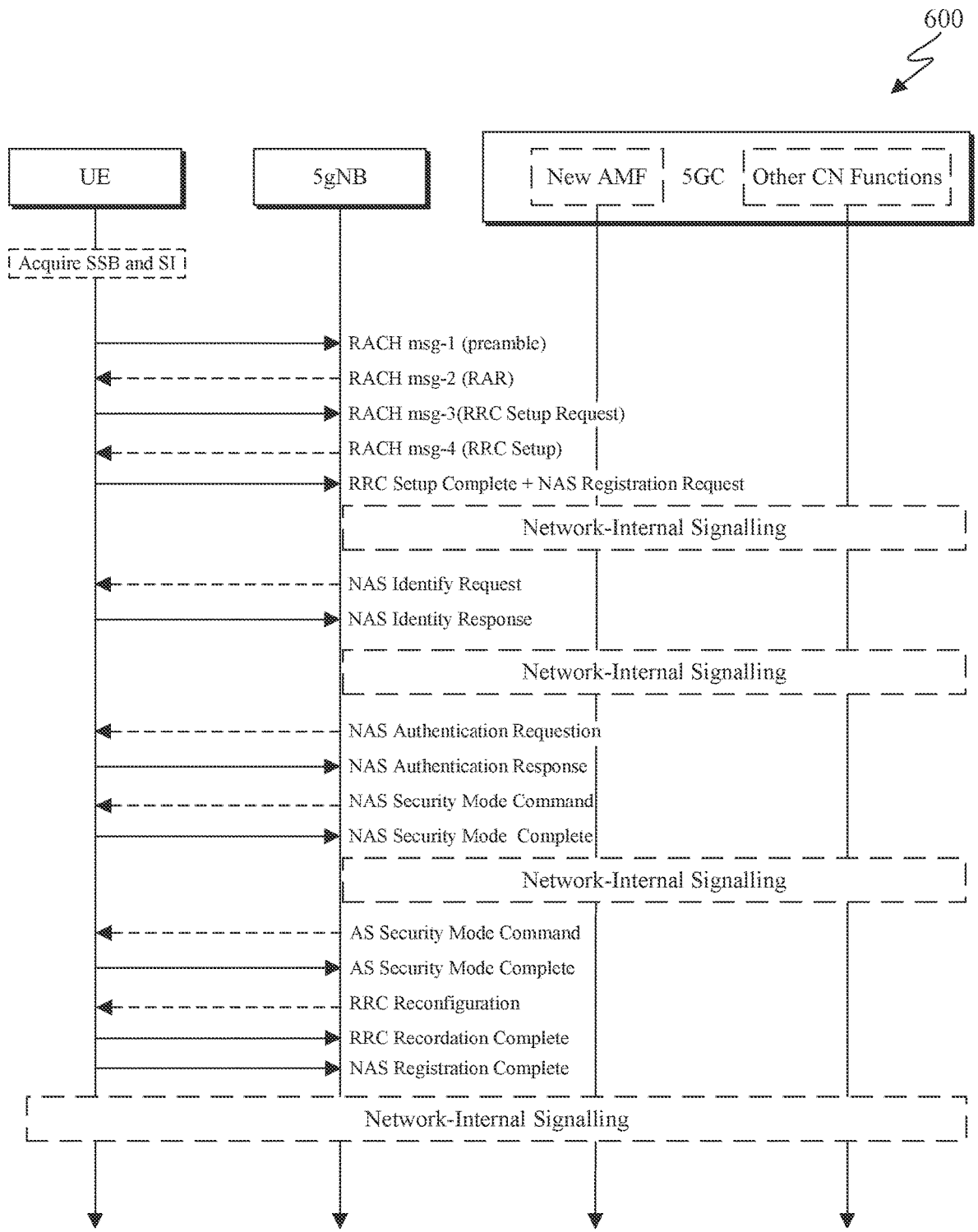
FIG. 6 illustrates an example signaling sequence during a 5G Registration procedure with stored context according to embodiments of the present disclosure.
Figure 7:
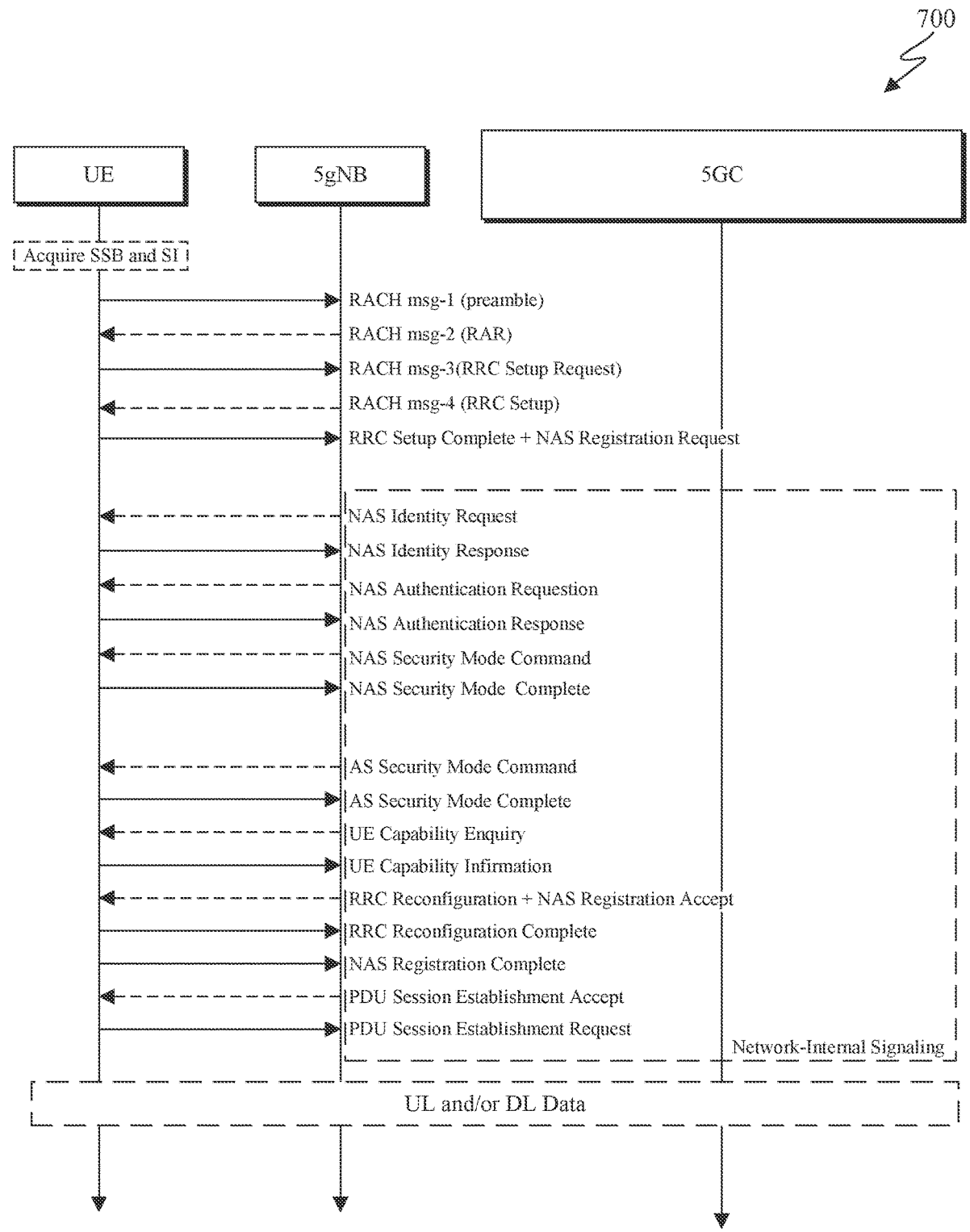
FIG. 7 illustrates an example signaling sequence during a 5G Registration procedure without stored context according to embodiments of the present disclosure.

FIG. 6 illustrates an example signaling sequence 600 during a 5G Registration procedure with stored context according to embodiments of the present disclosure. FIG. 7 illustrates an example signaling sequence 700 during a 5G Registration procedure without stored context according to embodiments of the present disclosure. The signaling sequence 600 and 700 are for illustration only and other embodiments can be used without departing from the scope of the present disclosure.

In certain embodiments, a UE (such as the UE 116) registers with the network to get authorized to receive services, to enable mobility tracking and to enable reachability. For example, an NR UE initiates the 5G Registration procedure using one of the following registration types: (i) Initial registration to the 5GS, (ii) Mobility registration update such as upon changing to a new Tracking Area (TA), (iii) Periodic registration update due to a predefined time period of inactivity; or (iv) Emergency registration.

NR UEs operating in standalone (SA) mode register to the 5G core network (5GS) using the 5G Registration procedure. NR UEs operating in non-standalone (NSA) mode first register for service with the 4G core network (EPC) using the LTE Attach procedure where the DL and UL signaling is transmitted and received on the LTE PCell. The UE then starts reporting measurements on the NR frequencies. If the signal quality for the UE supports 5G service, the LTE eNB communicates with the 5G NR gNB to assign resources for a 5G bearer. The 5G NR resource assignment is then signaled to the UE via an LTE RRC Connection Reconfiguration message. Once the RRC Connection Reconfiguration procedure is completed, the UE simultaneously connects to the LTE and NR networks.

During the 5G Registration procedure for initial access, the UE must execute several access stratum (AS) and non-access stratum (NAS) procedures. AS procedures often correspond to RRC procedures, but may also involve procedures in L1, MAC, RLC, PDCP or lightweight directory access protocol (LDAP). NAS procedures include a variety of functions such as connection, registration, mobility and session management. Connection management is used to establish and release the control plane signaling connection between the UE and the AMF. Registration management is used to register or deregister a UE or user with the 5GS, and to establish the user context in the 5GS. Mobility management functions are used to keep track of the current location of a UE. Session management functions are used to establish IP connectivity for a UE, e.g., to set up or (re-)configure protocol data unit (PDU) sessions including QoS parameters for IP flows. Some examples for NAS procedures executed by the UE and the network during initial registration include NAS Registration, NAS Identity verification, NAS Authentication, NAS Security establishment, PDU Session establishment. Some examples for AS procedures executed by the UE and network during initial registration include Random Access, RRC Setup, UE Capability, AS Security establishment and RRC Reconfiguration.

If the 5G Registration procedure during initial access completes successfully, the UE transitions from RRC_IDLE & CM_IDLE states to RRC_CONNECTED & CM_CONNECTED states. The UE is then usually released back by the gNB into RRC_INACTIVE or RRC_IDLE state unless it has data to transmit or receive right away. The UE NAS and AS capabilities are known and stored in the AMF as part of the UE context, e.g., UE capabilities and NAS security context remain known in the network. If the UE is in RRC_INACTIVE mode, UE context including AS security configuration is also stored in the gNB. The UE performs RRC_IDLE and RRC_INACTIVE mode cell re-selection. If data is to be received or transmitted later, the UE is paged by the network and/or performs random access to return to RRC_CONNECTED state.

The 5G Registration procedure is functionally equivalent to the LTE Attach with Default Bearer Establishment. In LTE and NR, the UE receives services through a PDU session which is a logical connection between UE and the data network. 5GS supports various PDU session types, for example, IPv4, IPv6, Ethernet, and the like. LTE UEs connecting to the evolved packet system (EPS) always establish at least one default PDU session (e.g., the default EPS bearer) when attaching to the LTE network. The 5GS can establish a session when service is needed irrespective of the attachment procedure of the UE. NR allows for UE attachment without any PDU session. 5GS also supports that UEs establish multiple PDU sessions to the same or different data network(s) over a single or multiple access networks including 3GPP and non-3GPP access. The number of user plane functions (UPFs) for a PDU session is not specified in 5G NR. For 5G NR UEs with multiple PDU sessions, there is no need for a single point gateway like serving gateway (SGW) in the EPC, e.g., the user-plane paths of different PDU sessions can be completely disjoint. 5G NR also supports slice-aware mobility and congestion management. For example, a slice-ID is introduced as part of the PDU session information in 5G that is transferred during mobility signaling.

The signaling sequence 600, as illustrated in FIG. 6 describes an example signaling sequence during 5G registration with stored context.

As illustrated, the NR UE (such as the UE 116) is in RRC_IDLE state. The UE performs PMLN and cell selection. The UE context already exists at the Old AMF in the selected PMLN, e.g., the UE has previously connected to the PMLN, but has not maintained the previously established radio connection for a prolonged period of time.

The UE acquires one or more SSB(s), reads at least a system information block (SIB1) and possibly other system information messages. The UE performs the Random Access procedure using parameters obtained from SIB1. RA can operate in two modes: (i) contention-based random access (CBRA) where UEs within a serving cell can share same RA resources and there is therefore a possibility of collision among RA attempts from different UEs, and (ii) contention-free random access (CFRA) where a UE has dedicated RA resources that are indicated by a serving gNB and may not be shared with other UEs so that RA collisions can be avoided. A 4-step random access procedure, also known as a Type-1 (L1) random access procedure, includes the following steps/operations for a UE: transmission of a PRACH preamble (Msg-1); attempting to receive a random access response (RAR) (or Msg-2); transmitting a contention resolution message (Msg-3); and attempting to receive a contention resolution message (Msg-4). An alternative random access procedure can be also considered, which is so-called 2-step RACH or a Type-2 L1 random access procedure, where Msg-1 and Msg-3 are combined into a "Msg-A" transmission and Msg-2 and Msg-4 above are combined into a "Msg-B" reception. Various embodiments of the disclosure are described using the 4-step RACH procedure, although the embodiments can generally apply to 2-step RACH as well and explicit individual descriptions are typically omitted for brevity.

The UE selects a random access preamble. The preamble is referenced with the Random Access Preamble Id (RAPID). The UE starts T300 to await the RRC Setup message from the network. In response to its PRACH transmission, the UE attempts to detect a DCI Format 1_0 with cyclic redundancy check (CRC) scrambled by the RA radio network temporary identifier (RNTI) (RA-RNTI) corresponding to the RACH transmission. The UE looks for a RACH message 2 (msg-2) from the network during a configured window of length ra-ResponseWindow. The Temporary cell-RNTI (C-RNTI) assignment will be signaled to the UE in the RAR message. The RA-RNTI scrambled DCI message signals the frequency and time resources assigned for the transmission of the Transport Block (TB) containing the RAR message. The UE detects a DCI Format 1_0 with CRC scrambled by the corresponding RA-RNTI and receives a TB in a corresponding PDSCH. The RAR carries the TA, UL grant and the Temporary C-RNTI assignment. UE picks a random identity that will be used during contention resolution. The UE transmits RACH msg-3 carrying its RRC Setup Request message using the information from the RAR. The RRC Setup Request message is sent with the random ue-Identity and an establishment cause. The RRC Setup message is then transmitted by the network to the UE in RACH msg-4 to setup SRB1 and to configure the master cell. The RRC Setup message carries the radioBearerConfig and masterCellGroup information elements. The UE stops T300 as it has received the RRC Setup message. The UE configures Signaling Radio Bearer (SRB) 1. The gNB assigns UL resources to the UE so that it can send the RRC Setup Complete message. The UE sends the RRC Setup Complete message with a "Registration Request" in the dedicatedNAS-Message field.

The gNB selects the Access and Mobility Function (AMF) for this session. The gNB allocates a "RAN UE NGAP ID". The AMF will use this id to address the UE context on the gNB. The gNB sends the Initial UE Message to the selected AMF. The message carries the "Registration Request" message that was received from the UE in the RRC Setup Complete message. The "RAN UE NGAP ID" and the "RRC Establishment Cause" are also included in the message. Since the 5G-GUTI was included in the Registration Request and the serving AMF has changed since last Registration procedure, the new AMF requests context transfer from the old AMF. The complete NAS registration message received from the UE is included in the context request. The AMF performs an integrity check on the Registration Request to guard against malicious attacks. The Old AMF passes the AMF UE Context to the new AMF. The AMF saves the UE context that was obtained from the Old AMF.

The New AMF requests UE Identity (SUCI) from the UE via the NAS Identity Request message. The UE responds to the NAS Identity Request message via the NAS Identity Response message. Because authentication is needed for the UE, the AMF selects "Authentication Server Function" based on the SUCI. The AMF requests UE authentication vectors and algorithm information from the Authentication Server Function (AUSF). The unified data manage (UDM) generates the authentication vectors for the session. UDM returns authentication data. The response returns the master key which is used by AMF to derive NAS security keys and other security key(s). The subscription permanent identifier (SUPI) is also returned to the AMF. The New AMF initiates the authentication procedure with the UE. It sends the key selector, RAND and AUTN to the UE using the NAS Authentication Request message. The UE responds to the authentication challenge using the NAS Authentication Response message.

The AMF signals the selected NAS security algorithm to the UE using the NAS Security Mode Command message. The AMF also requests the IMEISV from the UE. The UE signals the completion of the NAS security procedure using the NAS Security Mode Complete message. The message contains the IMEISV.

Since the AMF has changed the new AMF notifies the old AMF that the registration of the UE in the new AMF is now completed. The performance equipment identifier (PEI) will be used to perform the equipment check. The Equipment Identity Check service is invoked. This service is provided by the 5G-EIR to check the PEI and determine whether the PEI is blacklisted. The 5G-EIR reports that the device as identified by the PEI has not been blacklisted. A Unified Data Management (UDM) service entity is selected by the New AMF. Since the AMF has changed, the New AMF registers with the UDM. The New AMF retrieves the Access and Mobility Subscription data. The New AMF retrieves the session management function (SMF) Selection Subscription data. The New AMF retrieves the UE context in SMF data.

The New AMF creates the UE context for the user. The Old AMF is notified that it is no longer serving the user. The Old AMF notifies the SMF that it is no longer associated with the specified PDU session and the AMF removes the AMF context.

The New AMF select the Policy and Charging Function (PCF) service entity. The new AMF contacts the PCF to create a policy association and retrieve the UE policy and/or Access and Mobility control policy. The PCF responds with the policy association information. The PCF registers for events like "Location Report", "Registration State Report" and "Communication Failure Report". The New AMF responds to the PCF to signal successful subscription. The Old AMF requests that the policy association is deleted as the corresponding UE context is terminated.

Since "List of PDU Sessions To Be Activated" was included in the Registration Request received from the UE, the New AMF initiates PDU Session reactivation. The Session Management Function (SMF) is requested to setup a new session. The SMF assigns a UE address for the PDU session and allocates a TEID that the gNB should use when sending UL GTP PDUs to the UPF. The SMF selects a user data plane for the user. The Packet Forwarding Control Protocol (PFCP) is used between the SMF control plane and the UPF data plane. The Session Modification is signaled to the data plane. The UPF starts receiving data destined to the UE. However, the UPF needs to buffer the data as the PDU session has not been established yet at the gNB and the UE. The UPF data plane responds back to the SMF control plane after the session modification has been completed. The SMF informs the AMF that the Session Management context has been updated. The AMF allocates an "AMF UE NGAP ID". The gNB will use this id to address the UE context on the AMF. The AMF initiates a session setup with the gNB. The message typically contains the NAS Registration Accept message. The message carries one or more PDU Session setup requests. Each PDU session is addressed with the "PDU Session ID". The message also carries the uplink TEID for every PDU session. The message also carries the "AMF UE NGAP ID", "UE Aggregate Maximum Bit Rate", UE security capabilities and security key. Note that it is at this point that the AMF may transfer previously stored UE context to the gNB, e.g., UE radio access capabilities if previously stored become known to the serving gNB.

The AMF transmits the NAS Security Mode Command message to the UE. Note that the K-gNB is a key derived by UE and AMF from K-AMF. The UE replies with the NAS Security Mode Complete message. The UE configures lower layers to apply SRB integrity protection using the indicated algorithm and the K-RRC-int key immediately. Note that the NAS Security Mode Complete message is integrity protected but not ciphered. SRB ciphering will start immediately after sending this message using the indicated algorithm and the K-RRC-enc key after completing the procedure.

The RRC Reconfiguration message is sent by the gNB to the UE for setting up radio bearers, setup a secondary cell and initiate UE measurements. The UE confirms successful completion of the RRC connection reconfiguration with the RRC Reconfiguration Complete message.

The gNB allocate the TEID that the UPF will use to send DL data to the gNB. The gNB signals the successful setup of PDU sessions to the AMF. The message also carries the DL TEID that should be used (specified per PDU session).

The UE signals the completion of the registration via the NAS Registration Complete message to the AMF. Since the UL path has now been setup completely, the UE starts sending data. The gNB sends the UE data to the UL TEID. The UPF starts sending the data to the Internet.

The AMF modifies the Session Management Context based on the updates from the gNB. The Downlink TEIDs for all the PDU sessions will be passed to the SMF. The SMF control plane signals session updates to the UPF data plane. The UPF can stop the data buffering as a DL path has been setup. The UPF sends the buffered data to the gNB using the DL TEID for the PDU session. All new DL data also takes the same path. The UPF data plane responds back to SMF control plane. The SMF notifies the AMF that session management context update is complete.

The signaling sequence 700, as illustrated in FIG. 7, describes an example signaling sequence during 5G registration without stored context.

As illustrated in the signaling sequence 700, the NR UE (such as the UE 116) is in RRC_IDLE state. The UE performs PMLN and cell selection. There is no stored UE context in any AMF in the selected PMLN. For example, the UE has not previously connected to the selected network, or the UE has previously connected to the selected network but has not been connected to it for a duration longer than a configured or stored NAS timer value allows. The UE must therefore execute the 5G Registration procedure without context.

Similar to the example for 5G Registration with stored context in FIG. 7, the UE performs PMLN and cell selection. The UE acquires one or more SSB(s), reads at least SIB1 and possibly other system information messages. Then, the UE performs the Random Access procedure. Following reception of the RAR by the UE, a RRC Setup Request message is transmitted by the UE in RACH msg-3. The UE receives an RRC Setup message in RACH msg-4. The UE sets up SRB1 and configures the master cell. The UE transmits the RRC Setup Complete message with a NAS Registration Request in the dedicatedNAS-Message field.

The UE receives the NAS Identity Request message in the DL and replies with a NAS Identity Response message in the UL. The network then transmits a NAS Authentication Request message to the UE and the UE replies with a NAS Authentication Response message. Following successful UE authentication, the NAS Security Mode Command message is transmitted to the UE. The UE applies the received keys and transmits the NAS Security Mode Complete message. In the next step, UE and gNB establish AS encryption and integrity protection. The UE receives the AS Security Mode Command message and transmits the AS Security Mode Complete message. After successful activation of AS security by PDCP, the UE switches to SRB2 and establishes a Data Radio Bearer (DRB). Subsequently exchanged NAS messages such as NAS Register Complete and NAS PDU Session Establishment Request/Accept are then exchanged using SRB2.

At this point in time, e.g., following successful establishment of AS security, the gNB can retrieve the UE capabilities. The gNB transmits an RRC UE Capability Enquiry message to the UE and the UE replies with an RRC UE Capability Information message. Note that up to 80 msec RRC processing delay are allowed for the UE upon reception of the UE Capability Enquiry message. For example, the gNB may solicit UE capability information for one or more NR bands. The obtained UE radio access capabilities may be stored in the network as part of the UE context for use in future network access attempts by the UE.

The gNB transmits an RRC Connection Reconfiguration message and NAS Registration Accept message to the UE. Because the gNB has now learned about the UE radio access capabilities, it can configure any desired L1 radio transmission and reception parameters as available by the UE implementation. For example, if the UE were to support asymmetric bandwidth combinations for a particular NR band, the gNB can now configure the UE with corresponding DL and UL BWPs. Note that the gNB in the RRC Setup message transmitted in the RACH msg-4 only configures mandatorily supported and tested L1 features supported by all UEs.

Following RRC reconfiguration, the UE transmits a NAS Register Complete message, then requests PDU session establishment by transmitting the NAS PDU Session Establishment Request message. The networks transmits a NAS PDU Session Establishment Accept message to the UE. The 5G Registration procedure ends. DL and/or UL data to/from the UE can be scheduled and transmitted.

It is noted that that LTE requires around 10 DL and 10 UL messages, e.g., RRC and NAS, to be exchanged during the LTE Attach procedure. NR requires slightly fewer messages, e.g., 9 UL messages and 7 DL messages, the first such message being RACH msg-5 carrying the RRC Setup Complete and NAS Registration Request messages as can be seen in the example signaling exchange sequence in FIG. 7. Most of these messages are small-sized, e.g., one or several hundred bytes. Some messages like the RRC Connection Reconfiguration message can be much larger, e.g., up to one or several KB. Note that the allowed maximum RRC message size is 9 KB in R15. The RRC and NAS procedures executed during the 5G Registration procedure are "atomic" and "in sequence", e.g., they must be executed one after the other and mostly require successful completion of the preceding procedure before the next one can start. For example, the NAS Authentication Request message can only be sent to the UE by the AMF after the NAS Identity Response message has been received from the UE. The AS Security procedure can only be executed after the UE has been identity-verified and authorized by NAS and NAS keys are derived. Therefore, with few exceptions like the combined RRC Setup Complete+NAS Registration Request messages, the RRC and NAS signaling exchanges during the 5G Registration procedure can mostly not be collapsed, e.g., sent together in a single message.

The following embodiments of the present disclosure describe MAC subPDUs. This is described in the following examples and embodiments, such as those of FIGS. 8-12.

Figure 8:
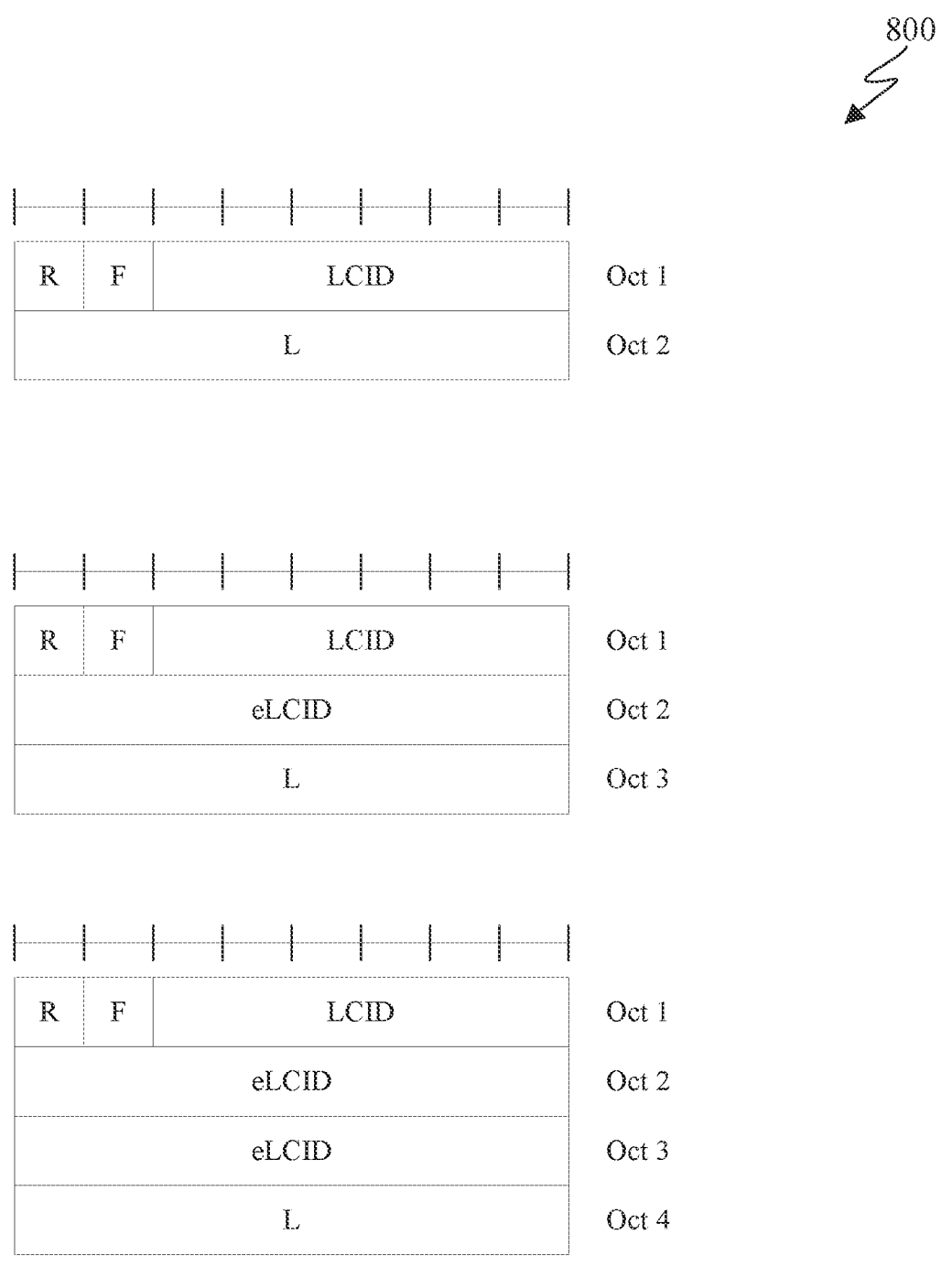
Figure 9:
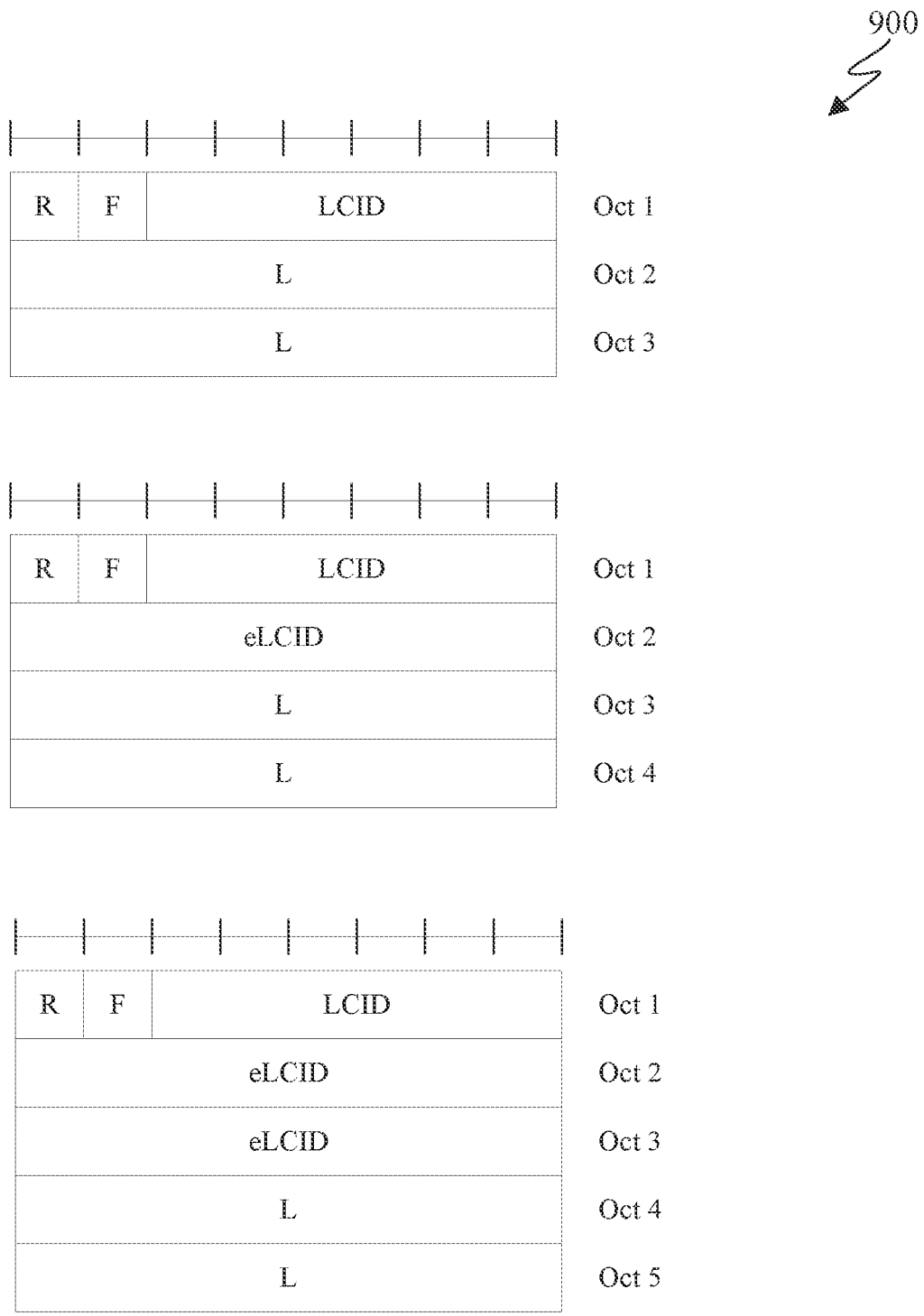
FIG. 9 illustrates an example diagram of a MAC subheader according to embodiments of the present disclosure.
Figure 10:
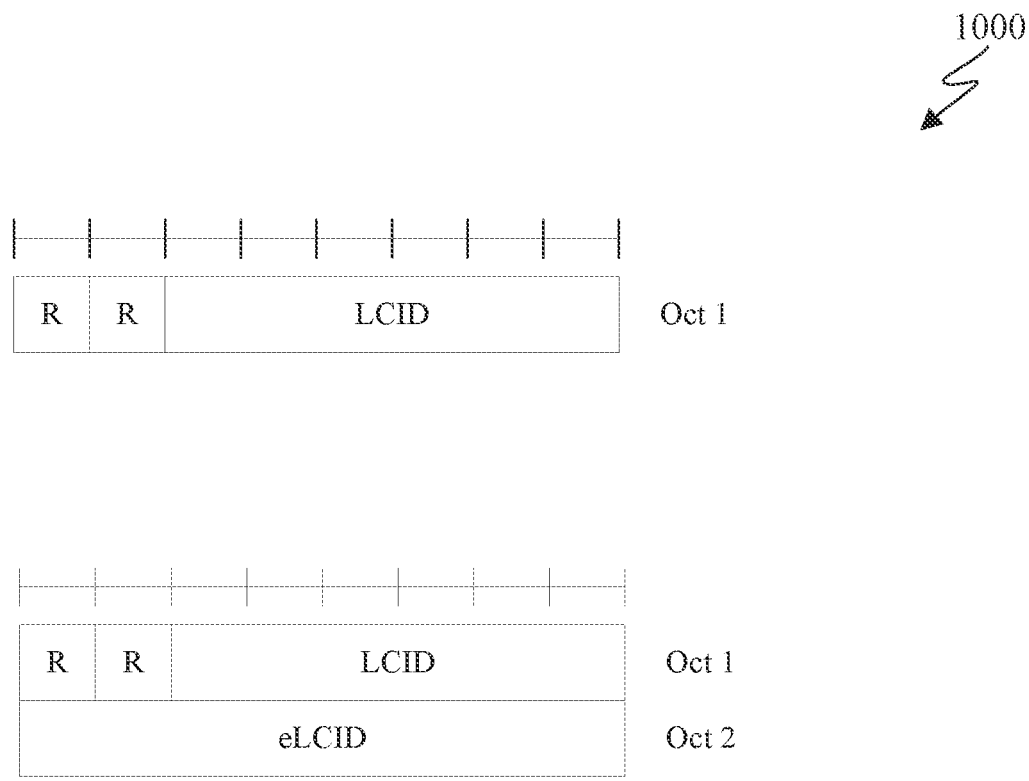
FIG. 10 illustrates an example diagram of a MAC subheader according to embodiments of the present disclosure.
Figure 11:
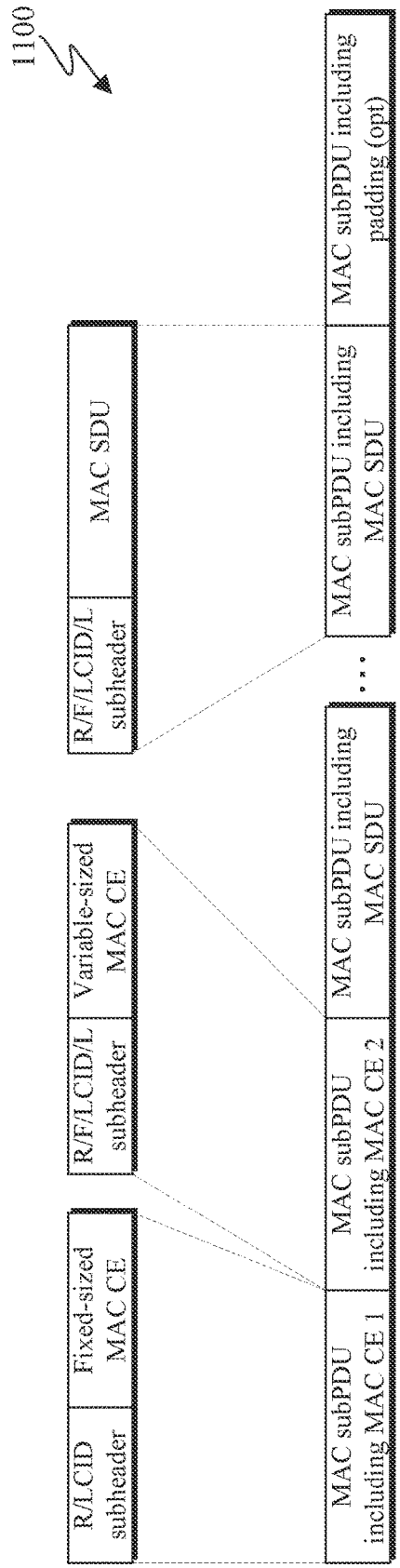
FIG. 11 illustrates an example diagram of a downlink (DL) MAC protocol data unit (PDU) according to embodiments of the present disclosure.
Figure 12:
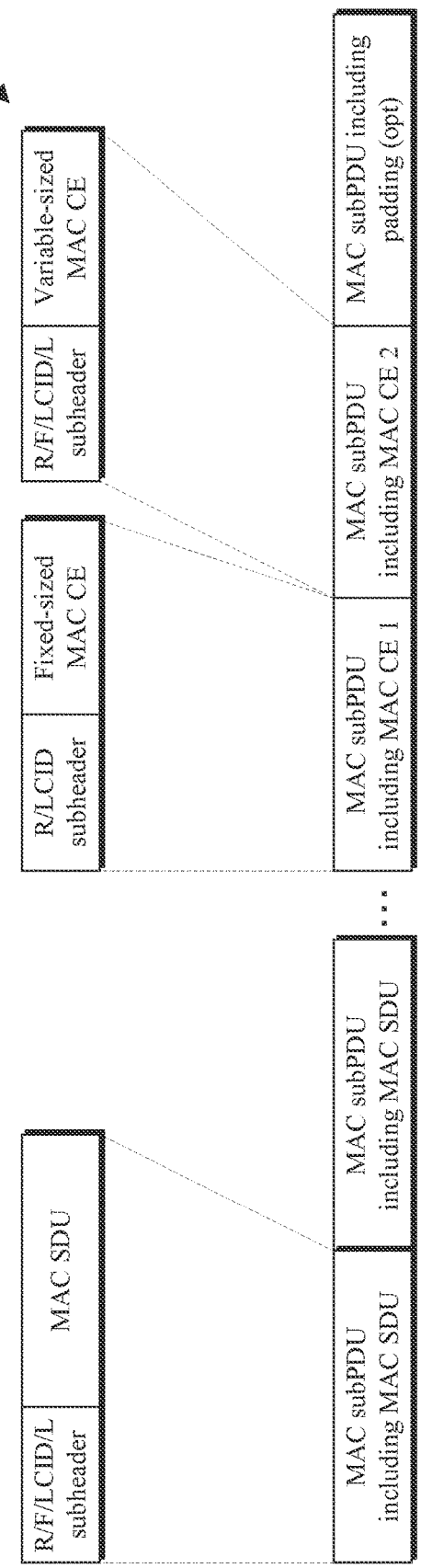
FIG. 12 illustrates an example diagram of an uplink (UL) MAC PDU according to embodiments of the present disclosure.

FIG. 8 illustrates an example diagram 800 of a MAC subheader according to embodiments of the present disclosure. FIG. 9 illustrates an example diagram 900 of a MAC subheader according to embodiments of the present disclosure. FIG. 10 illustrates an example diagram 1000 of a MAC subheader according to embodiments of the present disclosure. FIG. 11 illustrates an example diagram 1100 of a DL MAC PDU according to embodiments of the present disclosure. FIG. 12 illustrates an example diagram 1200 of an UL MAC PDU according to embodiments of the present disclosure. The diagrams 800-1200 are for illustration only and other embodiments can be used without departing from the scope of the present disclosure.

In certain embodiments, a MAC PDU includes one or more MAC subPDUs. Each MAC subPDU includes one of the following: a MAC subheader only (including padding); a MAC subheader and a MAC service data unit (SDU); a MAC subheader and a MAC control element (CE); a MAC subheader and padding. The MAC SDUs are of variable sizes. Each MAC subheader corresponds to either a MAC SDU, a MAC CE, or padding.

A MAC subheader except for fixed sized MAC CE, padding, and a MAC SDU containing UL common control channel (CCCH) includes the header fields R/F/LCID/(eLCID)/L. A MAC subheader for fixed sized MAC CE, padding, and a MAC SDU containing UL CCCH includes the two header fields R/LCID/(eLCID).

The diagram 800, as illustrated in FIG. 8, describes a R/F/LCID/(eLCID)/L MAC subheader with 8-bit L field.

The diagram 900, as illustrated in FIG. 9, describes a R/F/LCID/(eLCID)/L MAC subheader with 16-bit L field.

The diagram 1000, as illustrated in FIG. 10, describes a R/LCID/(eLCID) MAC subheader.

In certain embodiments, MAC CEs are placed together. DL MAC subPDU(s) with MAC CE(s) is placed before any MAC subPDU with MAC SDU and MAC subPDU with padding as depicted in FIG. 11. UL MAC subPDU(s) with MAC CE(s) is placed after all the MAC subPDU(s) with MAC SDU and before the MAC subPDU with padding in the MAC PDU as depicted in FIG. 12. The size of padding can be zero. A maximum of one MAC PDU can be transmitted per TB per MAC entity.

The MAC subheader is octet aligned and includes following fields: (i) logical channel identification (LCID), (ii) extended LCID (eLCID), (iii) Length (also denoted as "L"), (iv) format (also denoted as "F"), and (v) reserve bit (also denoted as "R").

The field LCID describes the Logical Channel ID field identifies the logical channel instance of the corresponding MAC SDU or the type of the corresponding MAC CE or padding as described in Tables 6.2.1-1 and 6.2.1-2 for the DL-SCH and UL-SCH respectively. There is one LCID field per MAC subheader. The size of the LCID field is 6 bits. If the LCID field is set to 34, one additional octet is present in the MAC subheader containing the eLCID field and follow the octet containing LCID field. If the LCID field is set to 33, two additional octets are present in the MAC subheader containing the eLCID field and these two additional octets follow the octet containing LCID field.

The field eLCID describes the extended Logical Channel ID field identifies the logical channel instance of the corresponding MAC SDU or the type of the corresponding MAC CE as described in tables 6.2.1-1a, 6.2.1-1b, 6.2.1-2a and 6.2.1-2b for the DL-SCH and UL-SCH respectively. The size of the eLCID field is either 8 bits or 16 bits. Note that the extended Logical Channel ID space using two-octet eLCID and the relevant MAC subheader format is used, only when configured, on the NR backhaul links between IAB nodes or between IAB node and IAB Donor.

The field L describes the Length field indicates the length of the corresponding MAC SDU or variable-sized MAC CE in bytes. There is one L field per MAC subheader except for subheaders corresponding to fixed-sized MAC CEs, padding, and MAC SDUs containing UL CCCH. The size of the L field is indicated by the F field.

The field F describes the Format field indicates the size of the Length field. There is one F field per MAC subheader except for subheaders corresponding to fixed-sized MAC CEs, padding, and MAC SDUs containing UL CCCH. The size of the F field is 1 bit. The value 0 indicates 8 bits of the Length field. The value 1 indicates 16 bits of the Length field.

The field R describes the Reserved bit, which can be set to 0.

Tables 1-3, below, summarize the usage of LCID and eLCID for UL-SCH as by REF5. In particular, Table (1) describes the values of LCID for UL-SCH, Table (2)

describes values of two-octet eLCID for UL-SCH, and Table (3) describes values of one-octet eLCID for UL-SCH.

TABLE 1

| Codepoint/Index | LCID values |
| --- | --- |
| 0 | CCCH of size 64 bits (referred to as "CCCH1" in REF8) |
| 1-32 | Identity of the logical channel |
| 33 | Extended logical channel ID field (two-octet eLCID field) |
| 34 | Extended logical channel ID field (one-octet eLCID field) |
| 35-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bits (referred to as "CCCH" in REF8) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

TABLE 2

| Codepoint | Index | LCID values |
| --- | --- | --- |
| 0 to ($2^{16}$ − 1) | 320 to ($2^{16}$ + 319) | Identity of the logical channel |

TABLE 3

| Codepoint | Index | LCID values |
| --- | --- | --- |
| 0 to 249 | 64 to 313 | Reserved |
| 250 | 314 | BFR (four octets $C_i$) |
| 251 | 315 | Truncated BFR (four octets $C_i$) |
| 252 | 316 | Multiple Entry Configured Grant Confirmation |
| 253 | 317 | Sidelink Configured Grant Confirmation |
| 254 | 318 | Desired Guard Symbols |
| 255 | 319 | Pre-emptive BSR |

The following embodiments of the present disclosure describe TDD operations. This is described in the following examples and embodiments, such as those of FIGS. 13 and 14.

Figure 13:
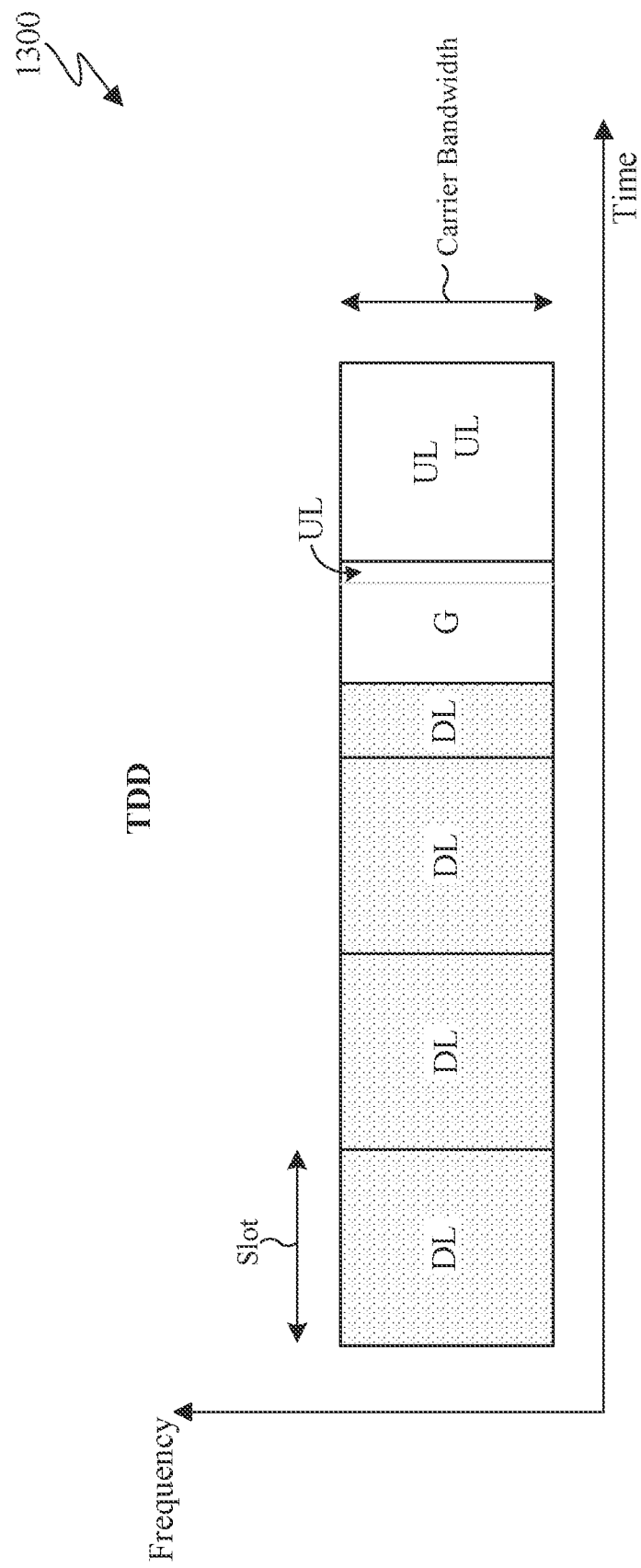
FIG. 13 illustrates an example diagram of a time division duplexing (TDD) communication system according to embodiments of the present disclosure.
Figure 14:
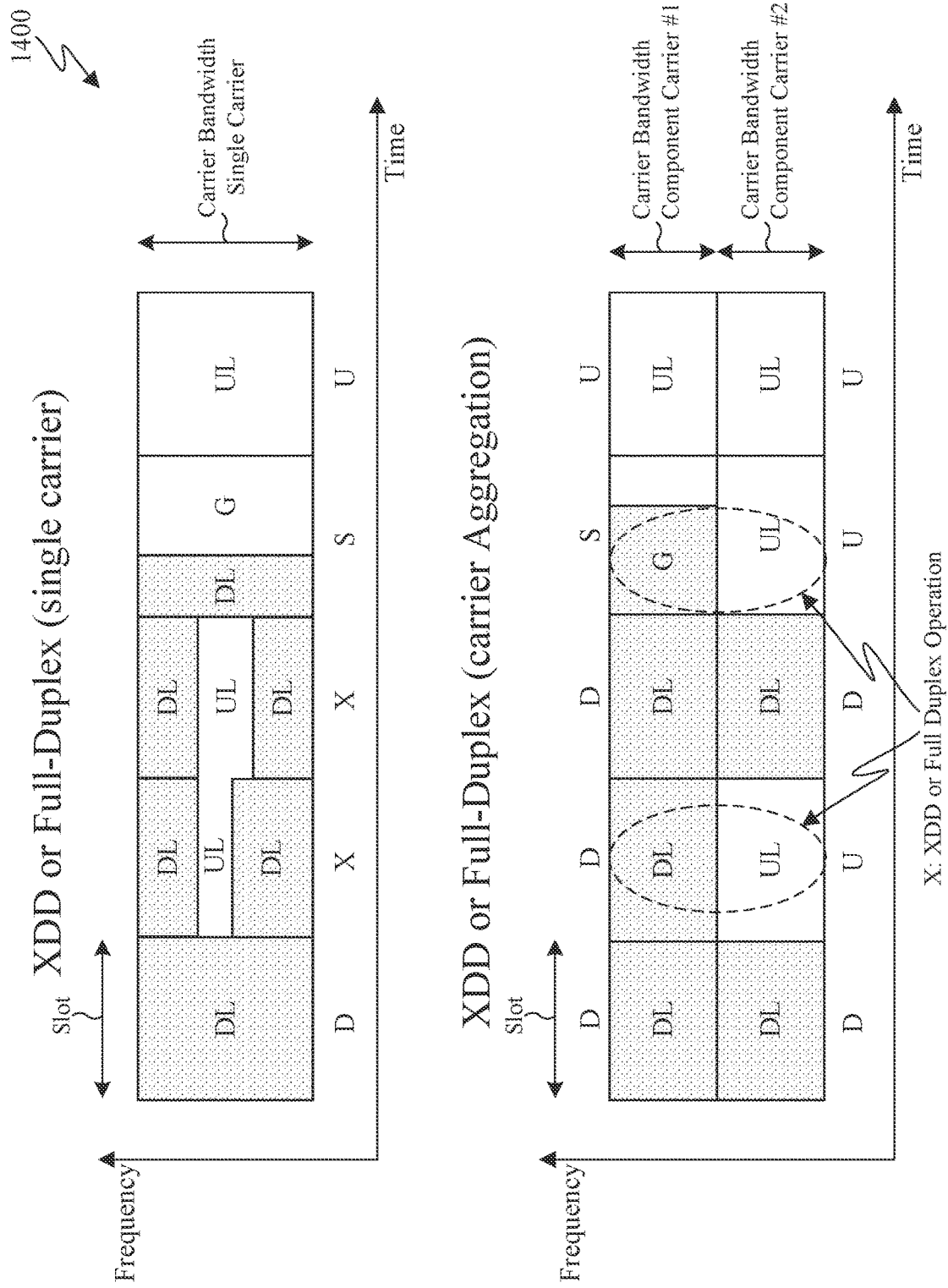
FIG. 14 illustrates an example diagram of two example full-duplex communication system configurations according to embodiments of the present disclosure.

FIG. 13 illustrates an example diagram 1300 of a time division duplexing (TDD) communication system according to embodiments of the present disclosure. FIG. 14 illustrates an example diagram 1400 of two example full-duplex communication system configurations according to embodiments of the present disclosure. The diagrams 1300 and 1400 are for illustration only and other embodiments can be used without departing from the scope of the present disclosure.

In certain embodiments, 5G NR radio supports TDD operation and frequency division duplex (FDD) operation. Use of FDD or TDD depends on the NR frequency band and per-country allocations. TDD is required in most bands above 2.5 GHz. For example, the diagram 1300, as illustrated in FIG. 13 describes an example, TDD communications system.

The diagram 1300, as illustrated in FIG. 13 describes a DDDSU UL-DL configuration, where D denotes a DL slot, U denotes an UL slot, and S denotes a special or switching slot with a DL part, a flexible part that can also be used as guard period G for DL-to-UL switching, and optionally an UL part.

In certain embodiments, TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there is a large number of antennas.

Although there are advantages of TDD over FDD, embodiments of the present disclosure take into consideration that there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, a dynamic adaptation of link direction has been considered where, with the exception of some symbols in some slots supporting predetermined transmissions such as for SSBs, symbols of a slot can have a flexible direction (UL or DL) that a UE can determine according to scheduling information for transmissions or receptions. A PDCCH can also be used to provide a DCI format, such as a DCI format 2_0 as described in REF 3, that can indicate a link direction of some flexible symbols in one or more slots. Nevertheless, in actual deployments, it is difficult for a gNB scheduler to adapt a transmission direction of symbols without coordination with other gNB schedulers in the network. This is because of CLI where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused or only respective subsets can be active for transmissions and receptions when FD communication is enabled.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with full-duplex mode even when a UE operates in half-duplex mode, such as when the UE can either transmit and receive at a same time, or the UE can also be capable for full-duplex operation.

Full-duplex transmission/reception is not limited to gNBs, TRPs, or UEs, but can also be used for other types of wireless nodes such as relay or repeater nodes.

Full duplex operation needs to overcome several challenges in order to be functional in actual deployments. When using overlapping frequency resources, received signals are subject to co-channel CLI and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the disclosure, Cross-Division-Duplex (XDD) is used as a short form for a full-duplex operation. The terms XDD and full-duplex are interchangeably used in the disclosure.

Full-duplex operation in NR can improve spectral efficiency, link robustness, capacity, and latency of UL transmissions. In an NR TDD system, UL transmissions are limited by fewer available transmission opportunities than DL receptions. For example, for NR TDD with sub-carrier spacing (SCS)=30 kHz, DDDU (2 msec), DDDSU (2.5 msec), or DDDDDDDSUU (5 msec), the UL-DL configurations allow for an DL:UL ratio from 3:1 to 4:1. Any UL transmission can only occur in a limited number of UL slots, for example every 2, 2.5, or 5 msec, respectively.

The diagram 1400, as illustrated in FIG. 14, describes two example full-duplex communication system configurations.

As illustrated in FIG. 14, For a single carrier TDD configuration with full-duplex enabled, slots denoted as X are full-duplex or XDD slots. Both DL and UL transmissions can be scheduled in XDD slots for at least one or more symbols. The term XDD slot is used to refer to a slot where UEs can simultaneously both receive and transmit in at least one or more symbols of the slot if scheduled or assigned radio resources by the base station. A half-duplex UE cannot both transmit and receive simultaneously in an XDD slot or on a symbol(s) of an XDD slot. When a half-duplex UE is configured for transmission in symbols of an XDD slot, another UE can be configured for reception in the symbols of the XDD slot. A full-duplex UE can transmit and receive simultaneously in symbols of an XDD slot, possibly in presence of other UEs scheduled or assigned resources for either DL or UL in the symbols of the XDD slot. Transmissions by a UE in a first XDD slot can use same or different frequency-domain resources than in a second XDD slot, wherein the resources can differ in bandwidth, a first RB, or a location of the center carrier.

As illustrated in FIG. 14, for an intra-band dual-carrier (carrier aggregation) TDD configuration with full-duplex enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, full-duplex slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for full-duplex operation. UL transmissions can also occur in a last slot (U) where the full UL transmission bandwidth is available. XDD slots or symbol assignments over a time period or number of slots can be indicated by a DCI format in a PDCCH reception and can then vary per unit of the time period, or can be indicated by higher layer signaling, such as via a MAC CE or RRC.

Embodiments of the present disclosure take into consideration that the use of the 5G Registration procedure is unavoidable. Following successful registration with the 5GS, UEs can spend a significant amount of time, e.g., days, in RRC_IDLE or RRC_INACTIVE states. When DL and/or UL signaling or data is to be transmitted and/or received, the UE can perform the Random Access procedure to enter RRC_CONNECTED state and benefit from much reduced control plane setup time, e.g., 10-20 msec from RRC_I-NACTIVE to RRC_CONNECTED states. However, full 5G registration with or without UE context is still required intermittently. For example, 5G registration by the UE is required in events such as after re-connecting to the public land mobile network (PLMN) after prolonged periods of time, upon UE cold start or at expiry of a variety of configurable NAS timer settings. Necessity of and events leading to the execution of the 5G Registration procedure by the NR UE are similar to the case of LTE and the LTE Attach procedure.

It is one recognized and reported problem in LTE TDD and NR TDD network deployments that TDD mode results in significantly increased initial access delays due to the LTE Attach or 5G Registration procedures when compared to LTE or NR FDD networks.

In the case of LTE FDD, the overall duration of the LTE Attach procedure beginning with PSS/SSS acquisition and ending with successful PDU session establishment by the UE is found to be in the order of around 100-110 msec under good signal conditions. Despite some differences in the detailed signaling message sequence and number of signaling messages involved due to differences between EPC and 5GS, NR FDD network deployments are observed to require approximately similar duration, e.g., 100-110 msec, for completion of the 5G Registration procedure, e.g., from acquiring SSBs to the PDU Session Management Accept message. For NR TDD network deployments operating in SA mode, significantly higher initial access delays are observed. The overall duration of the 5G Registration procedure is much longer, e.g., up to 250-300 msec. A similar observation is known from many existing LTE TDD networks in operation when compared to LTE FDD.

For both FDD and TDD mode it is assumed that acquiring SSBs and SIB1 takes 20-30 msec, the RACH procedure takes around 30 msec, and RRC and NAS message processing delays in UE and network require 20 msec. It is noted that small differences can exist between FDD and TDD modes. The largest contributor to the much longer initial access delay observed for TDD networks is the time required to complete the RRC and NAS signaling message sequence during the 5G Registration procedure. Even if no HARQ re-transmission is required and there is always immediate scheduling availability for any DL and UL channel, TDD will require a significantly larger amount of time when compared to FDD.

This is due to two underlying reasons. Usually, TDD has fewer UL than DL transmission opportunities in a UL-DL frame period than FDD. Additional transmission delay is incurred in TDD networks (1) by the DL-UL frame alignment delay and (2) a longer duration to complete the DL and UL transmission sequence when compared to FDD networks.

NR FDD with SCS=15 kHz (30 kHz) incurs an average frame alignment delay of ½ slot or 0.5 msec (0.25 msec) before the next UL transmission can start. NR TDD with SCS=30 kHz and using a DDDDDDDSUU pattern for the 5 msec long UL-DL frame period will in average incur a bit less than 2.5 msec UL frame alignment delay. Frame alignment delay is the delay between an assumed uniformly distributed random arrival time and the next possible transmission opportunity. For DL transmissions in NR FDD with SCS=15 kHz, the duration of the DL grant+PDSCH+PUCCH transmission sequence may require around 3 TTIs or 3 msec per message with UE PDSCH processing capability 1. For UL transmissions, the SR+UL grant+PUSCH transmission sequence may require around 5 TTIs or 5 msec with conservative settings. For DL transmissions in NR TDD with SCS=30 kHz, the duration of the DL grant+PDSCH+PUCCH transmission sequence is larger than in FDD, mostly because transmission of DL HARQ A/N on PUCCH requires to wait for the next available UL slot. At least 5 msec are required to complete the DL transmission sequence within a UL-DL frame period. For UL transmissions in NR TDD, the SR in an UL slot of UL-DL frame period #n can earliest schedule a PUSCH in the UL slot(s) of the next UL-DL period #(n+1). In presence of PDSCH and PUSCH processing capabilities 1, the complete UL transmission sequence of SR+UL grant+PUSCH requires around 12 TTIs, e.g., 2 complete UL-DL frame periods or 10 msec. This is again significantly longer than in FDD. Each of these additional delay contributions observed in TDD applies per DL and per UL message, e.g., each single one of the 9 DL messages and 7 UL messages exchanged after RACH msg4 during the 5G Registration signaling sequence example shown in FIG. 7 incurs an additional delay inherent to TDD when compared to FDD.

It is therefore highly desirable to reduce the total amount of time required to complete a 5G Registration procedure with NR TDD, e.g., to decrease the observed difference between NR FDD and TDD mode operating in SA mode. When XDD or full duplex is deployed on an NR TDD carrier, additional UL transmission opportunities become available in DL slots. The average TDD frame alignment delay and the average duration to complete a DL scheduling sequence and an UL scheduling sequence are reduced. The total duration required to complete the 5G Registration procedure when operating in NR TDD and SA mode decreases correspondingly which leads to faster network connectivity during initial access.

A first problem is that despite half-duplex UE operation in TDD networks deploying XDD or full-duplex operation in several DL slots, UEs still need to support a certain number of XDD-optimized features to fully benefit from the full-duplex capable transmissions and receptions in the gNB. The gNB however, does not learn about the UE support for XDD or full-duplex features until very late during the 5G Registration procedure, e.g., the gNB cannot schedule the XDD-optimized UE in XDD or full-duplex slots, or it can do so only in a limited way, e.g., such as legacy UEs would be scheduled. Therefore, DL and/or UL signaling messages exchanged between UE and network during the 5G Registration procedure cannot benefit from full-duplex capability in the gNB even if deployed and available in the network, e.g., initial access delays cannot be reduced.

For example, XDD-optimized support by a half-duplex UE is necessary because of the possibility that the network may flexibly schedule or configure UL transmissions in designated DL slots, e.g., XDD slots. This requires knowledge of the DL slots available for or being candidate to full-duplex transmissions, possibly the UL transmission bandwidth and the number or location of required guard sub-carriers and the applicable maximum transmit power levels or transmission conditions for such XDD slots or symbols. It is expected that the full-duplex enabled network will not always configure XDD or full-duplex slots or symbols as Flexible slots or symbols using only a single cell-specific or common UL-DL frame allocation pattern, because this approach would greatly increase monitoring activity and power consumption for all UEs including legacy UEs. In consequence, XDD-optimized UEs may require support for multiple UL-DL allocations. In addition, the UL slots and XDD slots will experience different reception conditions at the gNB due to antenna and panel design and deployment constraints. The number of TRX chains for transmission or reception, or areas for transmission or reception antennas available in normal DL or UL slots versus XDD slots, can be different between full-duplex implementations and half-duplex implementations. This is due to antenna design constraints to achieve sufficient spatial isolation between the Tx and Rx antenna ports in full-duplex operation. For example, receptions at a base station in normal UL slots may benefit from 32 TRX using a 12V× 8H×2P panel of size 40×60 cm, whereas receptions at the base station in XDD slots may only use 16 TRX and a part or panel with half size than the one in UL slots. In consequence, XDD-optimized devices may require support for a different PUSCH resource allocation mode to efficiently transmit in the XDD subband given the available full-duplex UL transmission bandwidth in a slot.

It can therefore be expected that even half-duplex UEs supporting a set of L1 and/or protocol enhancements for improved operation in a TDD network which is enabled for full-duplex operation at the network-side in the gNB will implement a number of features not available for legacy UEs. For full-duplex UEs, e.g., devices supporting full-duplex operation by means such as different antenna panels and/or subscriber data management (SDM) or equivalent means, similar considerations apply.

While it may be envisioned that UE-side enhancements in support of full-duplex operation at the gNB are signaled using the RRC UE capability procedure, it is only after the RRC UE Capability Information msg (UL) has been received by the gNB and after the resulting RRC Connection Reconfiguration message exchange in DL and UL has been completed that the gNB can start making use of XDD-optimized scheduling and channel assignments for the UE. In the example of the 5G Registration procedure without stored context in FIG. 7, only the last two transmitted NAS UL messages and 1 NAS DL message can potentially benefit from reduced frame alignment delays and shorter DL and/or UL transmission sequence enabled by full-duplex operation. All previously exchanged DL and UL messages do not benefit from the availability of XDD or full-duplex transmission and reception capability in the gNB. Note that it is common practice in LTE and NR networks to first configure the UEs with a default set of L1 and MAC/RLC/PDCP parameters as part of the RRC Setup msg received by a UE in RACH msg4. The full set of UE capabilities can be requested from the UE and reported back by the UE only after successful AS security establishment. This is due to the need to preserve and store the obtained UE context including the UE RAT capabilities in the network later. Any UE capability information obtained prior to NAS and AS security establishment is discarded as by REF7 and common established operator practice. Therefore, requesting UE capabilities multiple times, e.g., prior to and after AS security establishment, is also not commonly done. This approach increases the signaling and processing load for both network and UE and exposes the network to security vulnerabilities. In addition, only one RRC procedure can be in progress at any given point in time in the UE. While the UE capability enquiry from the network is in progress, including the allowed up to 80 msec RRC processing delay, any other RRC procedure must be queued, and this queuing contributes to an additional delay during initial access.

Various embodiments of the present disclosure address the above issue and provides additional design aspects for supporting an initial access procedure such as during 5G Registration where some or all associated messages are transmitted either in full or in part in XDD slots, and provides solutions as fully elaborated in the following.

Various embodiments of the present disclosure provide Early Indication methods for XDD and/or full-duplex enhanced UEs in Msg3 (of the 4-step RACH procedure) and MsgA (of the 2-step RACH procedure). Early Indication, e.g., prior to the RRC UE Capability signaling exchange, is provided by the UE to the network that the UE supports XDD and/or full-duplex features. The disclosure describes solutions for XDD Early Indication using new LCID and/or eLCID index value(s), new RRC message (e.g., CCCH2), or new MAC CE(s). Various embodiments of the present disclosure provide solutions to disable, enable, or request Early Indication of full-duplex UE capability from devices connecting to the network and to group Early Indication of the UE capability with Early Indication for other features.

Using the solutions described in this disclosure, the connection establishment time during initial access in an NR TDD system operating in standalone mode can be reduced to 140-160 ms; for example, with SCS=30 kHz and a DDXXXXXSUU as UL-DL allocation. A substantial speed improvement is observed for the case of the 5G Registration procedure.

Without loss of generality, any feature or a combination of features implemented in the UE and/or signaled to the gNB for improved support of XDD or full-duplex operation when deployed and/or enabled in the network will be referred to as full-duplex UE capability in this disclosure. The gNB may implement full-duplex operation while the UE operates in half-duplex. The UE provides an indication of its full-duplex UE capabilities to the network. The UE may be capable to operate in full-duplex instead of half-duplex and provides its full-duplex UE capabilities to the network. The UE full-duplex operation may additionally be subject to operational constraints such as in a limited number of slots or only when designated conditions are met. There may be more than one signaled and/or indicated full-duplex UE capability or feature group for the half-duplex or full-duplex UEs when implementing support for network-side full-duplex operation in in the UE. For example, a first full-duplex UE capability may indicate that the UE is capable of improved support for XDD or full-duplex operation in the network in half-duplex mode with a number of DL-UL switching symbol(s) for XDD or full-duplex operation. For example, a second full-duplex UE capability may indicate that the UE is capable of full-duplex operation with constraints such as a limited PUSCH allocation bandwidth. Without loss of generality, UEs providing improved support for XDD or full-duplex operation by means of various features or combination of features will be referred to as full-duplex enhanced UEs in the disclosure. Without loss of generality, early indication or an early access indication refers to a signaling mechanism in this disclosure permitting the network to handle full-duplex enhanced UEs differently than legacy UEs during initial access, i.e., before the UE capabilities are fully known in then network such as by means of the UE Capability Enquiry/Information message exchange.

Accordingly, embodiments of the present disclosure provide early indication methods for XDD and/or full-duplex enhanced UEs in Msg3 (of the 4-step RACH procedure) and MsgA (of the 2-step RACH procedure). The disclosure describes solutions for XDD Early Indication using, (i) new LCID and/or eLCID index value(s), (ii) new RRC message (e.g., CCCH2), (iii) and new MAC CE(s). In addition, the disclosure describes solutions to disable, enable, or request Early Indication of full-duplex UE capability from devices connecting to the network and to group Early Indication of the UE capability with Early Indication for other features.

The following embodiments of the present disclosure describe Early Indication that the UE implements features in support for full-duplex operation. This is described in the following examples and embodiments, such as those of FIGS. 15 and 16.

Figure 15:
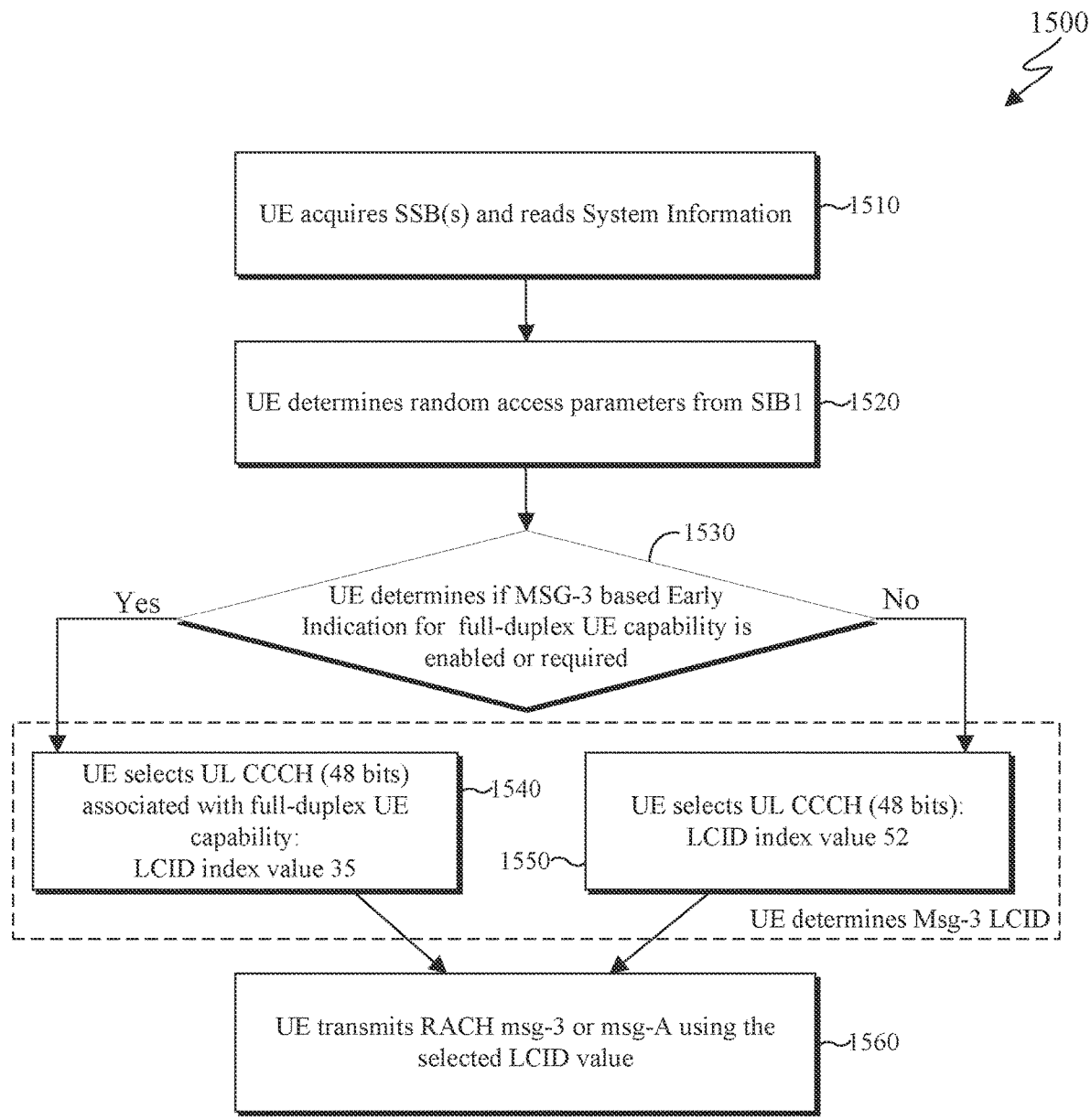
FIG. 15 illustrates an example method for determining the logical channel identification (LCID) index value(s) for Early Indication of full-duplex UE capability according to embodiments of the present disclosure.
Figure 16:
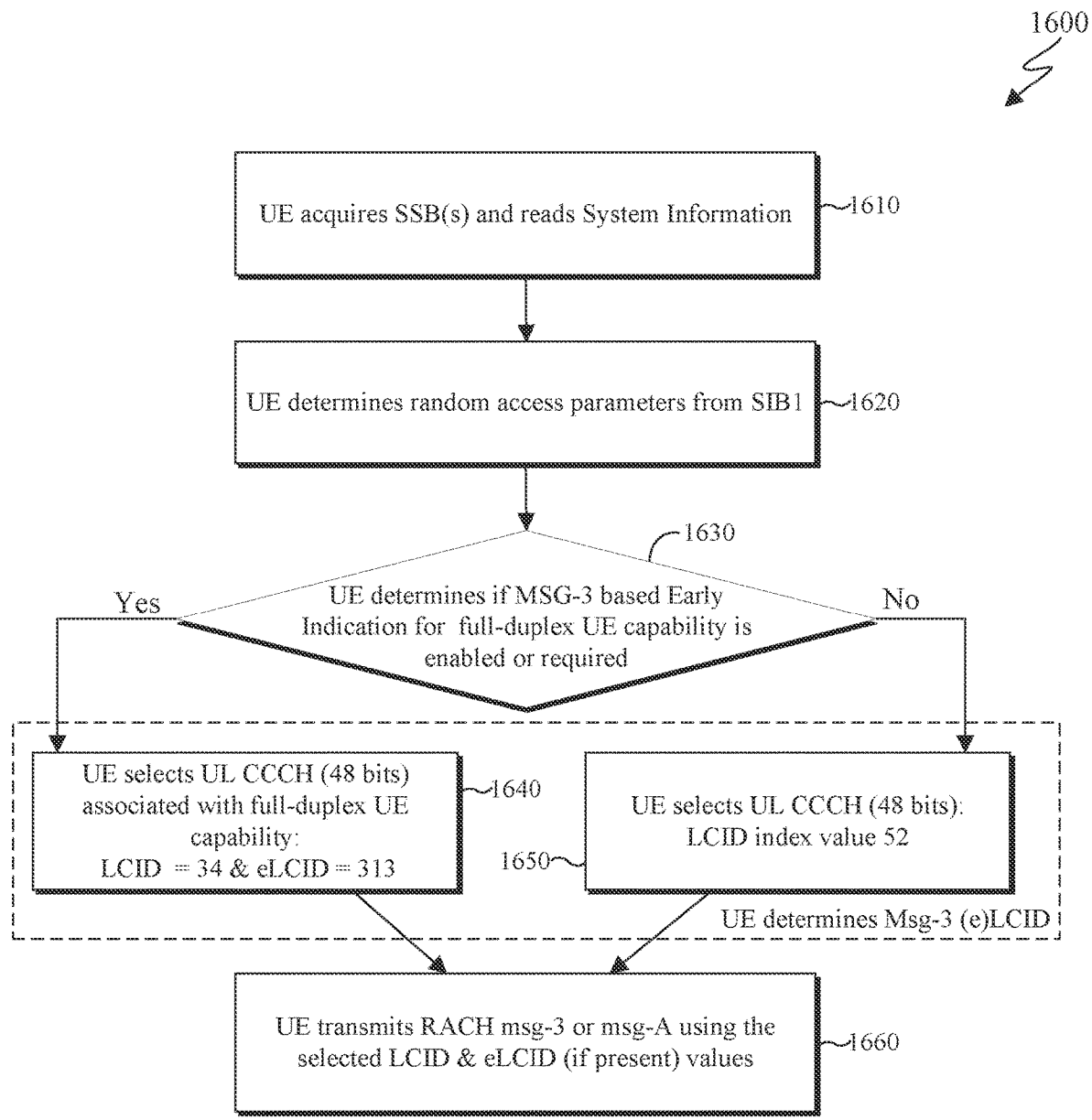
FIG. 16 illustrates an example method for determining the extended LCID ((e)LCID) index value(s) for Early Indication of full-duplex UE capability according to embodiments of the present disclosure.

FIG. 15 illustrates an example method 1500 for determining the LCID index value(s) for Early Indication of full-duplex UE capability according to embodiments of the present disclosure. FIG. 16 illustrates an example method 1600 for determining the eLCID index value(s) for Early Indication of full-duplex UE capability according to embodiments of the present disclosure. The steps of the method 1500 of FIG. 15 and the method 1600 of FIG. 16 can be performed by any of the UEs 111-116 of FIG. 1, such as the UE 116 of FIG. 3. The method 1500 and the method 1600 are for illustration only and other embodiments can be used without departing from the scope of the present disclosure.

In certain embodiments, a full-duplex enhanced UE (such as the UE 116) signals an Early Indication that the UE implements features in support for full-duplex operation using a distinct or separate LCID in RACH msg3 or RACH MsgA.

Early Indication by full-duplex enhanced UEs uses one of the 11 reserved LCID values (i.e., index values 35-44, and 47 in Table (1) from REF5). Alternatively, or in conjunction, the full-duplex enhanced UE uses one of the reserved eLCID values (i.e., index values 320 to ($2^{16}$+319) in Table (2) from REF5 or index values 64-313 in Table (3) from REF5) using either a two-octet or a one-octet eLCID format of UL-SCH.

Table (4) and Table (5), below, describe examples for usage of LCID and/or eLCID index values by full-duplex enhanced UEs when signaling their full-duplex capability to the gNB. In particular, Table (4) describes values of LCID for UL-SCH with full-duplex UE capability signaling for Early Indication and Table (5) describes values of one-octet eLCID for UL-SCH with full-duplex UE capability signaling for Early Indication.

Codepoint 35 and 36 of Table (4) and Codepoint 249 of Table (5) relate to additional LCID and/or eLCID index values for purpose of signaling the full-duplex UE capability to the gNB through the Early Indication signaling in this disclosure.

TABLE 4

| Codepoint/Index | LCID values |
|---|---|
| 0 | CCCH of size 64 bits (referred to as "CCCH1" in REF8) |
| 1-32 | Identity of the logical channel |
| 33 | Extended logical channel ID field (two-octet eLCID field) |
| 34 | Extended logical channel ID field (one-octet eLCID field) |
| 35 | CCCH of size 48 bits for Early Indication of full-duplex UE capability |
| 36 | CCCH of size 64 bits for Early Indication of full-duplex UE capability |
| 37-44 | Reserved |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bits (referred to as "CCCH" in REF8) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

TABLE 5

| Codepoint | Index | LCID values |
|---|---|---|
| 0 to 248 | 64 to 312 | Reserved |
| 249 | 313 | Early Indication of full-duplex UE capability |
| 250 | 314 | BFR (four octets $C_i$) |
| 251 | 315 | Truncated BFR (four octets $C_i$) |
| 252 | 316 | Multiple Entry Configured Grant Confirmation |
| 253 | 317 | Sidelink Configured Grant Confirmation |
| 254 | 318 | Desired Guard Symbols |
| 255 | 319 | Pre-emptive BSR |

In one example, the full-duplex enhanced UE transmits an UL CCCH of size 48 bits or an UL CCCH1 of size 64 bits to provide an Early Indication to the gNB that it supports full-duplex UE capability using an LCID value associated with full-duplex UE capability.

The UE acquires a cell by measuring and/or detecting respective SSB(s). The UE acquires system information such as provided by the master information block (MIB), the SIB1 and/or system information messages. The UE determines random access parameters (e.g., such as a random access transmission configuration) from the broadcasted or from unicast signaled system information. If Early Indication of full-duplex UE capability is requested or required or enabled in the cell by the network (such as described in other embodiments of the disclosure), the UE selects an UL CCCH of size 48 bits using LCID index value 35 in Table (4). If no such Early Indication is requested or required or enabled in the cell, or the cell does not support full-duplex operation, the UE selects an UL CCCH of size 48 bits using LCID index value 52. The UE transmits UL CCCH as part of the MAC payload, e.g., carrying an RRC Setup Request message, by setting the selected LCID value correspondingly. The gNB detects presence of a RACH msg3 transmission in the scheduled resources for the UE. The gNB reads the LCID. If UL CCCH using LCID index value 52 is present, no Early Indication is provided by the UE. The gNB may schedule the UE subject to legacy TDD UL-DL frame configuration constraints, e.g., subsequent UL transmissions by the UE are scheduled in normal UL slots. However, if the gNB detects an Early Indication as provided by LCID index value 35 for the CCCH with otherwise unchanged RRC message format from the full-duplex enhanced UE, the gNB may schedule subsequent transmissions from/to that UE by using both XDD or full-duplex slots and/or UL slots. The method 1500, as illustrated in FIG. 15 describes an example UE processing chain for determination of the LCID to transmit RACH msg3 according to the embodiment of the disclosure.

The method 1500 describes an example UE processing chain to determine the LCID index value(s) for Early Indication of full-duplex UE capability.

In step 1510, a UE (such as the UE 116) acquires SSB(s) and reads system information. In step 1520, the UE determines random access parameters from SIB1. In step 1530, the UE determines if Msg-3 based Early Indication for full-duplex UE capability is enabled or required. Upon a determination that msg-3 based Early Indication for full-duplex UE capability is enabled or required (as determined in step 1530), then the UE in step 1540 selects UL CCCH (48 bits) associated with full-duplex UE capability based on LCID index value 35. Alternatively, upon a determination that Msg-3 based Early Indication for full-duplex UE capability is not enabled or not required (as determined in step 1530), then the UE in step 1550 selects UL CCCH (48) bits based on LCID index value 52. Thereafter, the UE in step 1560 transmits RACH msg-3 or msg-A using the selected LCID value (from step 1540 or step 1550).

For another example, the full-duplex enhanced UE transmits an UL CCCH of size 48 bits or an UL CCCH1 of size 64 bits to provide an Early Indication to the gNB that it supports full-duplex UE capability using an eLCID value associated with full-duplex UE capability.

The UE acquires a cell by measuring and/or detecting respective SSB(s). The UE acquires system information such as provided by the MIB, the SIB1 and/or system information messages. The UE determines random access parameters from the broadcasted or from unicast signaled system information. If Early Indication of full-duplex UE capability is requested or required or enabled in the cell by the network (such as described in other embodiments of the disclosure), the UE prepares an UL CCCH of size 48 bits for transmission using eLCID index value 313 in Table (5). The LCID index value in the first header octet is set to index value 34. If no such Early Indication is requested or required or enabled in the cell, or the cell doesn't support full-duplex operation, the UE selects an UL CCCH of size 48 bits using LCID index value 52. The eLCID octet is not present. The UE transmits UL CCCH as part of the MAC payload, e.g., carrying an RRC Setup Request message, by setting the selected LCID and eLCID value(s) correspondingly. The gNB detects presence of a RACH msg-3 transmission in the scheduled resources for the UE. The gNB reads the LCID. If UL CCCH using LCID index value 52 is present, no Early Indication is provided by the UE. The gNB may schedule the UE subject to legacy TDD UL-DL frame configuration constraints, e.g., subsequent UL transmissions by the UE are scheduled in normal UL slots. However, if the gNB detects an Early Indication as provided by LCID index value 34 and eLCID index value 313 for the UL CCCH with otherwise unchanged RRC message format from the full-duplex enhanced UE, the gNB may schedule subsequent transmissions from/to that UE by using both XDD or full-duplex slots and/or UL slots. Note that the total resulting RACH msg3 payload size in this example will be different for the case of a transmission from a legacy UE and the case of a transmission from a full-duplex UE capability UE providing Early Indication. FIG. 16 illustrates a corresponding example UE processing chain for determination of the (e)LCID values to transmit RACH msg3 according to the embodiment of the disclosure.

The method 1600, as illustrated in FIG. 16 describes an example UE processing chain to determine the (e)LCID index value(s) for Early Indication of full-duplex UE capability.

In step 1610, a UE (such as the UE 116) acquires SSB(s) and reads system information. In step 1620, the UE determines random access parameters from SIB1. In step 1530, the UE determines if Msg-3 based Early Indication for full-duplex UE capability is enabled or required. Upon a determination that msg-3 based Early Indication for full-duplex UE capability is enabled or required (as determined in step 1630), then the UE in step 1640 selects UL CCCH (48 bits) associated with full-duplex UE capability based on LCID index value 34 and eLCID index value 313. Alternatively, upon a determination that Msg-3 based Early Indication for full-duplex UE capability is not enabled or not required (as determined in step 1630), then the UE in step 1650 selects UL CCCH (48) bits based on LCID index value 52. Thereafter, the UE in step 1660 transmits RACH msg-3 or msg-A using the selected LCID value (from step 1640 or step 1650).

In certain embodiments, more than one LCID or eLCID values can be used for purpose of Early Indication by full-duplex enhanced UEs. For example, a first (e)LCID value or combination thereof is used to signal enhanced full-duplex support by a half-duplex UE and a second (e)LCID value or combination thereof signals support by a full-duplex UEs. In another example, different feature sets which can be implemented by full-duplex enhanced UEs are indicated by means of different (e)LCID values or combination thereof. As can be understood by someone skilled in the art, the particular choice of an LCID or eLCID value or combination thereof for purpose of Early Indication of enhanced full-duplex support by the UE is not important for as long as a currently reserved value in REF5 is chosen. For example, if LCID index value 44 is selected to indicate and signal full-duplex UE capability to the gNB, there is no change in the described functionality when compared to index value 35.

A motivation for using LCID and/or eLCID to signal Early Indication (EI) of full-duplex UE capability to the network is that RRC common control channel message formats can be re-used as is which reduces implementation complexity of the EI signaling. In particular, using LCID values with a different (from legacy) index values (e.g., codepoints) does not change the RACH msg3 payload size and does not impact the UL link budget and coverage.

Although FIG. 15 illustrates the method 1500 and FIG. 16 illustrates the method 1600 various changes may be made to FIGS. 15 and 16. For example, while the methods 1500 and 1600 are shown as a series of steps, various steps could overlap, occur in parallel, occur in a different order, or occur multiple times. In another example, steps may be omitted or replaced by other steps. For example, the steps of the method 1500 and the steps of the method 1600 can be executed in a different order.

The following embodiments of the present disclosure describe full-duplex enhanced UE that signal an Early Indication. This is described in the following examples and embodiments, such as those of FIGS. 17-20.

Figure 17:
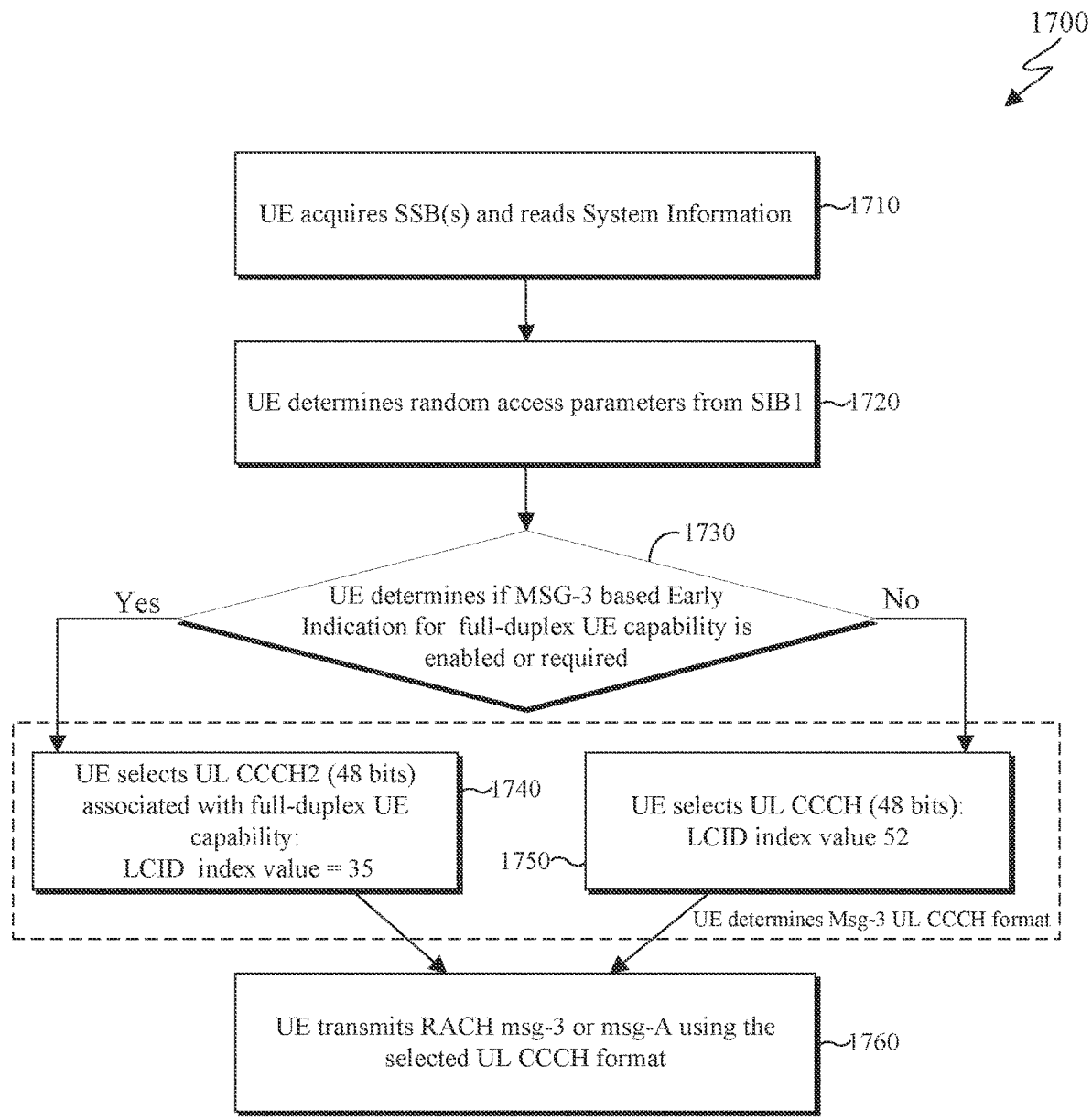
FIG. 17 illustrates an example method for determining the radio resource control (RRC) message format for early indication of full-duplex UE capability according to embodiments of the present disclosure.
Figure 18:
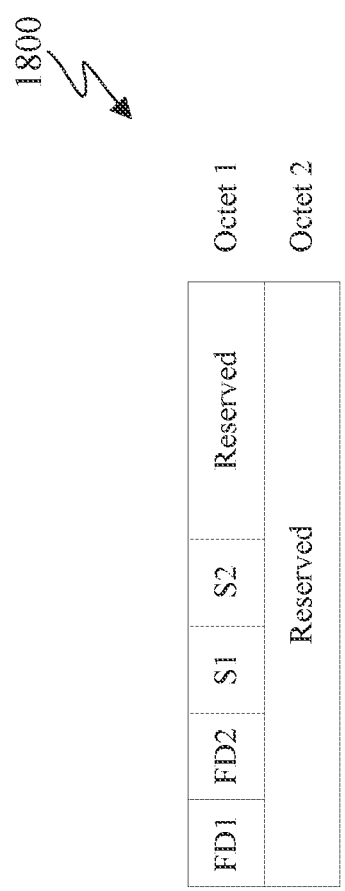
FIG. 18 illustrates an example diagram of a MAC coverage enhancement (CE) to signal full-duplex UE capability for Early Indication of full-duplex UE capability according to embodiments of the present disclosure.
Figure 19:
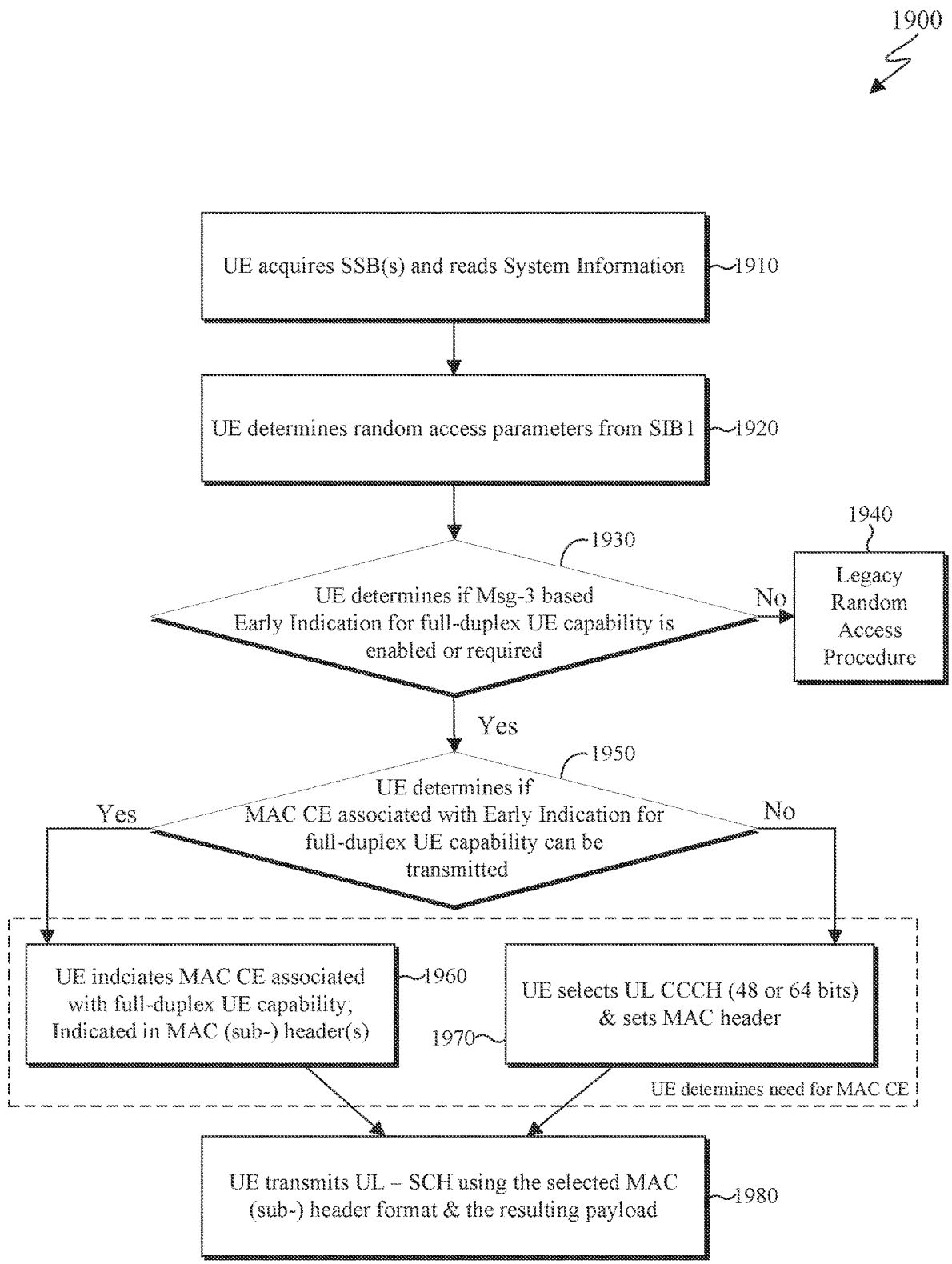
FIG. 19 illustrates an example method for determining the UL transmission format for Early Indication of full-duplex UE capability according to embodiments of the present disclosure.
Figure 20:
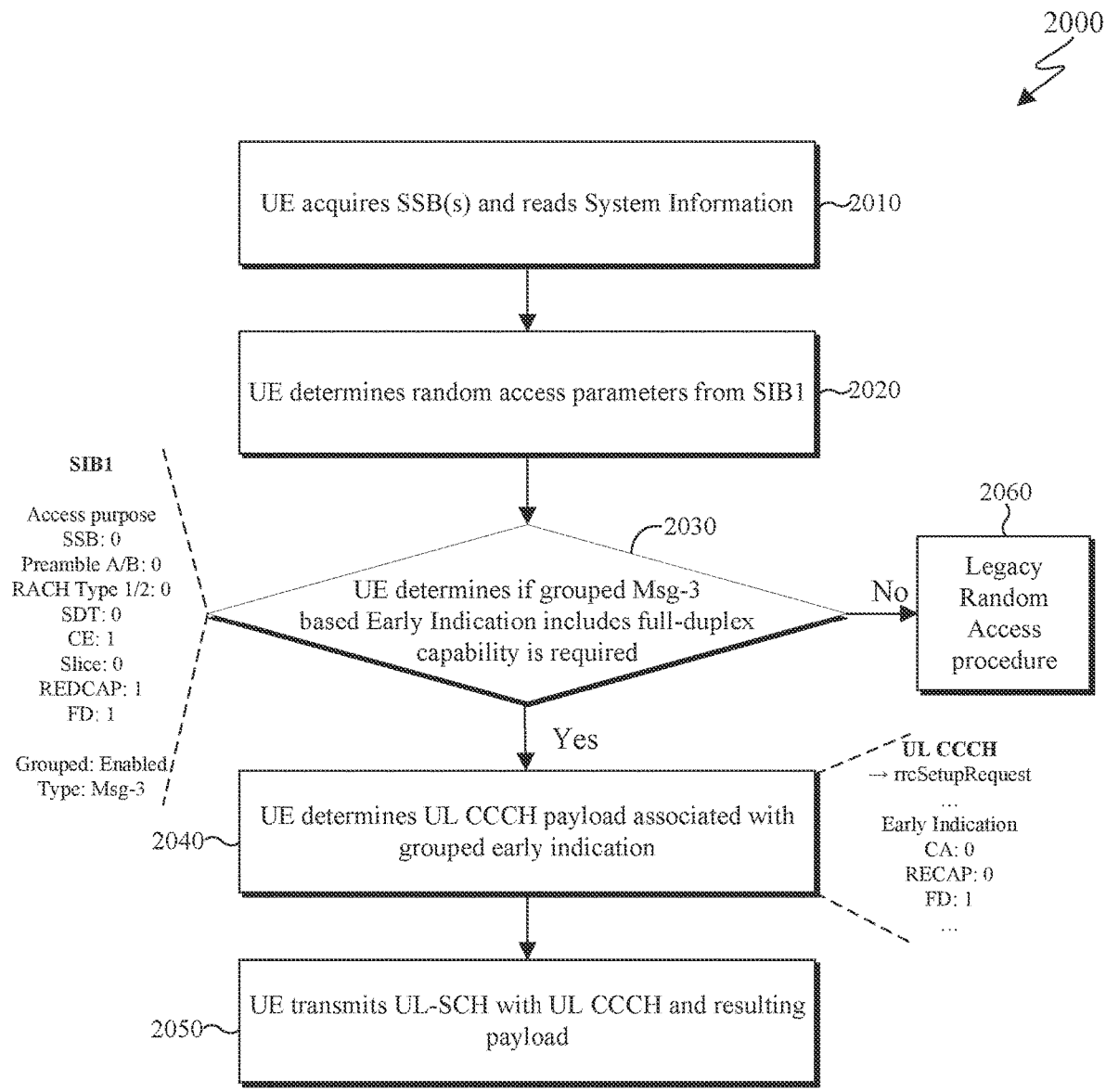
FIG. 20 illustrates an example method for signaling Early Indication of full-duplex UE capability in presence of grouped indication according to embodiments of the present disclosure.

FIG. 17 illustrates an example method 1700 for determining the RRC message format for Early Indication of full-duplex UE capability according to embodiments of the present disclosure. FIG. 18 illustrates an example diagram 1800 of a MAC CE to signal full-duplex UE capability for Early Indication of full-duplex UE capability according to embodiments of the present disclosure. FIG. 19 illustrates an example method 1900 for determining the UL transmission format for Early Indication of full-duplex UE capability according to embodiments of the present disclosure. FIG. 20 illustrates an example method 2000 for signaling Early Indication of full-duplex UE capability in presence of grouped indication according to embodiments of the present disclosure. The steps of the method 1700 of FIG. 17 and the method 1900 of FIG. 19, and the steps of the method 2000 of FIG. 20 can be performed by any of the UEs 111-116 of FIG. 1, such as the UE 116 of FIG. 3. The method 1500, the diagram 1800, the method 1900, and the method 2000 are for illustration only and other embodiments can be used without departing from the scope of the present disclosure.

In certain embodiments, the full-duplex enhanced UE signals an Early Indication that it implements features in support for full-duplex operation using a new UL CCCH message, e.g., new UL CCCH2 message, but not the existing UL CCCH or UL CCCH1 messages. Alternatively, the UE signals the Early Indication using the existing UL CCCH or UL CCCH1 message formats with modifications, e.g., including an indication of full-duplex UE capability in RACH msg3 or RACH MsgA.

Early Indication signaling by full-duplex enhanced UEs uses a new UL CCCH logical channel message of length N. For example, N=48 bits, or N=64 bits, or N for any required number of bits. The UE transmits the new logical channel UL CCCH message to the network. Syntax (1), below, describes an example RRC message format to signal full-duplex UE capability for Early Indication of full-duplex UE capability. In particular, Syntax (1), below describes an example of a length N=64 bits RRC message format when the Early Indication by full-duplex enhanced UEs is encoded and signaled as a new or separate UL CCCH format, e.g., UL CCCH2. Bold underlined font denotes the added ASN.1 parameters for purpose of signaling the full-duplex UE capability to the gNB through the Early Indication signaling in this disclosure. UL CCCH2 in the example has length N=64 bits like UL CCCH1. Aligning the payload size of UL CCCH1 and UL CCCH2 as shown in this example is desirable for radio link robustness and to facilitate protocol implementation, but a different choice for the length of the UL CCCH2 message is also possible. Note that the EstablishmentCause IE is shortened to allow for the same RRC message length N=64 bits with existing UL CCCH1 and the new UL CCCH2 when including the DuplexCapability IE in UL CCCH2. As can be understood by someone skilled in the art, signaling of the Early Indication for enhanced full-duplex support by the UE using an UL CCCH2 of length N=48 bits aligned with the size of the existing UL CCCH logical channel format can be realized using the same solution as described for the case of UL CCCH1 with length N=64 bits. Note that the new UL CCCH logical channel message, e.g., UL CCCH2, may use a distinct LCID or eLCID index value. For example, LCID index values 0 and 52 are used for existing UL CCCH and UL CCCH1, but one of the reserved index values is assigned to the new UL CCCH2 as described in other embodiments of the disclosure.

describes the example of a length N=48 bits UL CCCH message carrying the RRC Setup Request message. Early Indication by full-duplex enhanced UEs is encoded and signaled using an existing spare bit. Bold underlined font denotes the added ASN.1 parameters for purpose of signaling the full-duplex UE capability to the gNB through the Early Indication signaling in this disclosure. Note that the modified payload format of the UL CCCH logical channel message may use the same LCID or eLCID index value in REF5. For example, LCID index values 52 is used for the existing UL CCCH carrying the RRC Setup Request message from the UE to the network including the Early Indication. However, it is also possible to use a separate, e.g., not 52, index value for the modified UL CCCH payload format as described in other embodiments of the disclosure. As can be understood by someone skilled in the art, signal-

| Syntax (1) |
| --- |

```
-- ASN1START
-- TAG-UL-CCCH2-MESSAGE-START
UL-CCCH2-Message ::=        SEQUENCE {
    Message                 UL-CCCH2-MessageType
}
UL-CCCH2-MessageType ::=    CHOICE {
    c1                      CHOICE {
        rrcSetupRequestFD       RRCSetupRequestFD,
        spare3 NULL,
        spare2 NULL,
        spare1 NULL
    },
    messageClassExtension SEQUENCE { }
}
-- TAG-UL-CCCH2-MESSAGE-STOP
-- ASN1STOP
-- ASN1START
-- TAG-RRCSETUPREQUESTFD-START
RRCSetupRequestFD ::=       SEQUENCE {
    rrcSetupRequestFD       RRCSetupRequestFD-IEs
}
RRCSetupRequestFD-IEs ::=   SEQUENCE {
    ue-Identity             InitialUE-Identity,
    establishmentCause      EstablishmentCause,
    spare                   BIT STRING (SIZE (1))
}
InitialUE-Identity ::=      CHOICE {
    ng-5G-S-TMSI-Part1      BIT STRING (SIZE (39)),
    randomValue             BIT STRING (SIZE (39))
}
EstablishmentCause ::=      ENUMERATED {
                            emergency, highPriorityAccess, mt-Access, mo-
Signalling,
                            mo-Data, mo-VoiceCall, mo-VideoCall, mo-SMS
mps-PriorityAccess, mcs-PriorityAccess,
                            spare2, spare1}
DuplexCapabilityEI ::=      ENUMERATED {
                            half-duplex, full-duplex, spare1, spare2}
-- TAG-RRCSETUPREQUESTFD-STOP
-- ASN1STOP
```

In an alternative technical realization, the UE signals the Early Indication to indicate support of its full-duplex UE capability using the existing, but modified UL CCCH or UL CCCH1 message formats. For example, an existing spare bit is used to signal the indication of full-duplex UE capability support by the UE in RACH msg3 or RACH MsgA.

Syntax (2), below, describes an example RRC message format to signal full-duplex UE capability for Early Indication of full-duplex UE capability. In particular, Syntax (2), ing of the Early Indication for enhanced full-duplex support by the UE using a modified payload format of UL CCCH1 of length N=64 bits aligned with the size of the existing UL CCCH1 logical channel format and LCID=0 can be realized using the same solution as described for the case of UL CCCH with length N=48 bits. For example, one of the spare codepoints available in the UL-CCCH1MessageType can be used to indicate an rrcSetupRequestFD payload format.

| Syntax (2) |
| --- |
| -- ASN1START<br>-- TAG-RRCSETUPREQUEST-START<br>RRCSetupRequest ::=       SEQUENCE {<br>   rrcSetupReques            RRCSetupRequest-IEs<br>}<br>RRCSetupRequest-IEs ::=   SEQUENCE {<br>   ue-Identity                InitialUE-Identity,<br>   establishmentCause       EstablishmentCause,<br>   spareDuplexCapabilityEI  BIT STRING (SIZE (1))<br>}<br>InitialUE-Identity ::=     CHOICE {<br>   ng-5G-S-TMSI-Part1       BIT STRING (SIZE (39)),<br>   randomValue               BIT STRING (SIZE (39))<br>}<br>EstablishmentCause ::=     ENUMERATED {<br>                            emergency, highPriorityAccess, mt-Access, mo-Signalling,<br>                            mo-Data, mo-VoiceCall, mo-VideoCall, mo-SMS, mps-PriorityAccess, mcs-PriorityAccess,<br>                            spare6, spare5, spare4, spare3, spare2, spare1}<br>-- TAG-RRCSETUPREQUEST-STOP<br>-- ASN1STOP |

In one example, the full-duplex enhanced UE transmits an UL CCCH2 of size 48 bits to provide an Early Indication to the gNB that it supports full-duplex UE capability using the new UL CCCH message associated with full-duplex UE capability.

The UE acquires a cell by measuring and/or detecting respective SSB(s). The UE acquires system information such as provided by the MIB, the SIB1 and/or system information messages. The UE determines random access parameters from broadcasted or from unicast signaled system information. If Early Indication of full-duplex UE capability is requested or required or enabled in the cell by the network (such as described in other embodiments of the disclosure), the UE selects UL CCCH2 transmission format of size 48 bits using an LCID index value 35 in Table (4). If no such Early Indication is requested or required or enabled in the cell, or the cell does not support full-duplex operation, the UE selects the UL CCCH of size 48 bits using LCID index value 52. The UE transmits the selected UL CCCH or UL CCCH2 as part of the MAC payload, e.g., carrying its RRC Setup Request message. The gNB detects presence of a RACH msg3 transmission in the scheduled resources for the UE. The gNB reads the LCID. If UL CCCH using LCID index value 52 is present, no Early Indication is provided by the UE. The gNB may schedule the UE subject to legacy TDD UL-DL frame configuration constraints, e.g., subsequent UL transmissions by the UE are scheduled in normal UL slots. However, if the gNB detects an Early Indication as provided by LCID index value 35 for the UL CCCH2 with the new RRC message format from the full-duplex enhanced UE, the gNB may schedule subsequent transmissions from/to that UE by using both XDD or full-duplex slots and/or UL slots.

The method 1700, as illustrated in FIG. 17, illustrates an example UE processing chain for determination of the RRC message format to transmit RACH msg3 according to the embodiment of the disclosure. In particular, the method 1700 describes an example UE processing chain to determine the RRC message format for Early Indication of full-duplex UE capability.

In step 1710, a UE (such as the UE 116) acquires SSB(s) and reads system information. In step 1720, the UE determines random access parameters from SIB1. In step 1730, the UE determines if Msg-3 based Early Indication for full-duplex UE capability is enabled or required. Upon a determination that msg-3 based Early Indication for full-duplex UE capability is enabled or required (as determined in step 1730), then the UE in step 1740 selects UL CCCH2 (48 bits) associated with full-duplex UE capability based on LCID index value 35. Alternatively, upon a determination that Msg-3 based Early Indication for full-duplex UE capability is not enabled or not required (as determined in step 1730), then the UE in step 1750 selects UL CCCH (48) bits based on LCID index value 52. Thereafter, the UE in step 1760 transmits RACH msg-3 or msg-A using the selected LCID value (from step 1740 or step 1750).

More than one RRC message format and/or corresponding (e)LCID values can be used for purpose of Early Indication by full-duplex enhanced UEs. For example, a first RRC message format is used to signal enhanced full-duplex support by a half-duplex UE and a second RRC message format signals support by a full-duplex UE. In another example, different feature sets can be implemented by full-duplex enhanced UEs are encoded, indicated and signaled as part of a new RRC message format. As can be understood by someone skilled in the art, the particular naming or labeling of the new RRC message formats or its included IEs for purpose of Early Indication of enhanced full-duplex support by the UE is not important for as long as it is distinct from currently named ASN.1 parameterization in REF8.

In certain embodiments, the full-duplex enhanced UE signals an Early Indication that it implements features in support for full-duplex operation using a MAC Control Element (MAC CE). Alternatively, a DL MAC CE is signaled by the gNB to control parameters associated with full-duplex transmissions in the cell, and/or an UL MAC CE is used by the UE for radio link control associated with full-duplex transmissions.

Early Indication signaling by full-duplex enhanced UEs uses a new MAC CE. For example, N=1 octet, or N=2 octets, or N for any required number of octets or bits. The UE transmits the MAC CE associated with full-duplex UE capability to the network as part of an UL-SCH transmission. FIG. 20 shows the example of a length N=2 octets MAC CE format when the Early Indication by full-duplex enhanced UEs is encoded and signaled. The full-duplex UE capability MAC CE may be identified by a separate combination of LCID and/or eLCID as described in other embodiments of the disclosure. The MAC CE has fixed size and includes two octets defined as follows: (i) HD1: If set, this field indicates that the UE supports half-duplex operation; (ii) FD1: If set, this field indicates that the UE supports full-duplex operation; (iii) S1: If set, this field indicates that the UE supports Tx-Rx switching capability 1; (iv) S2: If set, this field indicates that the UE supports Tx-Rx switching capability 2; (v) R: Reserved bit, set to "0".

As can be understood by someone skilled in the art, signaling of the Early Indication for enhanced full-duplex support by the UE using a MAC CE of different length and/or different bit and/or index values representative of one or more feature capabilities associated with enhanced full-duplex support by the UE can be realized using the same solution as described for the case of the N=2 octet MAC CE in FIG. 18. In particular, the diagram 1800, as illustrated in FIG. 18, describes an example of MAC CE to signal full-duplex UE capability for Early Indication of full-duplex UE capability.

In certain embodiments, more than one MAC CE and/or corresponding (e)LCID values can be used for purpose of Early Indication by full-duplex enhanced UEs and gNB. For example, a first MAC CE is used for UL transmission to signal enhanced full-duplex support by a UE. A second MAC CE signals is used for DL transmissions by the gNB and requests indication or control of a particular setting and configuration of UEs providing enhanced full-duplex support. For example, the gNB may use the second DL MAC CE to set the UE Tx-Rx switching time or BWP configuration associated with full-duplex transmissions and scheduling in the network to a particular value. The DL MAC CE may include parameters or settings or configuration associated with full-duplex transmissions in the network pertaining to Tx or Rx timing incl. Timing Advance value(s); or maximum or minimum Tx power values for UL transmissions; BWPs for or location or number or size of guard intervals of subcarriers or RBs in frequency-domain for PUSCH or PUCCH or RACH or SRS transmissions.

For example, the gNB may signal that UL transmissions in a slot for purpose of full-duplex scheduling are bandwidth restricted using the DL MAC CE associated with full-duplex transmission. When the UE MAC entity receives the DL MAC CE indicating the PUSCH bandwidth restrictions on a serving cell, the MAC entity indicates to UE lower layers the information regarding the allowed PUSCH bandwidth. The UE may send an UL MAC CE to confirm reception of the DL MAC CE to the gNB.

Different features sets may be implemented by full-duplex enhanced UEs and may be encoded, indicated and signaled as part of a new MAC CE transmission format. As can be understood by someone skilled in the art, the particular naming or labeling of the new MAC CE format or the included IEs for purpose of Early Indication of enhanced full-duplex support by the UE is not important for as long as it is distinct from currently named IEs and parameterization in REF5.

In one example, the full-duplex enhanced UE transmits a MAC CE associated with full-duplex UE capability to provide an Early Indication to the gNB that it supports full-duplex UE capability.

The UE acquires a cell by measuring and/or detecting respective SSB(s). The UE acquires system information such as provided by the MIB, the SIB1 and/or system information messages. The UE determines random access parameters from broadcasted or from unicast signaled system information. If Early Indication of full-duplex UE capability is requested or required or enabled in the cell by the network (such as described in other embodiments of the disclosure), the UE includes the MAC CE associated with full-duplex UE capability in an UL message, e.g., RACH msg5 carrying the RRC Setup Complete message. If no such Early Indication is requested or required or enabled in the cell, or the cell does not support full-duplex operation, the UE does not include the MAC CE. The gNB detects presence of the MAC CE associated with full-duplex UE capability in an UL message in the scheduled resources for the UE. If present, the gNB reads the payload of the MAC CE. If no MAC CE is present, the gNB may schedule the UE subject to legacy TDD UL-DL frame configuration constraints, e.g., subsequent UL transmissions by the UE are scheduled in normal UL slots. However, if the gNB detects an Early Indication as provided by the MAC CE indication from the full-duplex enhanced UE, the gNB may schedule subsequent transmissions from/to that UE by using both XDD or full-duplex slots and/or UL slots. FIG. 19 illustrates an example UE processing chain for determination of the UL transmission format to transmit a MAC CE associated with full-duplex UE capability in an UL message according to the embodiment of the disclosure.

The method 1900, as illustrated in FIG. 19, describes an example UE processing chain to determine the UL transmission format for Early Indication of full-duplex UE capability.

In step 1910, a UE (such as the UE 116) acquires SSB(s) and reads system information. In step 1920, the UE determines random access parameters from SIB1. In step 1930, the UE determines if Msg-3 based Early Indication for full-duplex UE capability is enabled or required. Upon a determination that msg-3 based Early Indication for full-duplex UE capability is not enabled or not required (as determined in step 1730), then the UE in step 1940 performs legacy RA procedures. Alternatively, upon a determination that msg-3 based Early Indication for full-duplex UE capability is not enabled or not required (as determined in step 1730), then the UE in step 1950 determines if MAC CE associated with Early indication for full-duplex UE capability can be transmitted.

Upon a determination that MAC CE associated with Early indication for full-duplex UE capability can be transmitted (UL dedicated control channel (DCCH)) as determined in step 1950, the UE in step 1960 includes MAC CE associated with full-duplex UE capability; indicated in MAC (sub-)header(s). Alternatively, upon a determination that MAC CE associated with Early indication for full-duplex UE capability cannot be transmitted (UL DCCH) as determined in step 1950, the UE in step 1970 selects UL CCCH (48 or 64 bits) and sets MAC header. Thereafter, the UE in step 1980 transmits UL-SCH using the selected MAC (sub-)header format and the resulting payload.

One benefit of using MAC CE(s) associated with full-duplex UE capability and indicating full-duplex UE capability is that the UE may signal is its full-duplex UE capability using any, e.g., later than RACH msg3, UL signaling message. This adds flexibility and overcomes payload size limitations to which RACH msg3 may be subject to. UL transmissions corresponding to RRC and NAS procedures using DCCH can be individually scheduled and beamformed by the gNB. Inclusion of an additional MAC CE payload for Early Indication comes therefore at little cost to system performance even if the first UL transmission associated with RRC or NAS procedures during initial access cannot benefit from full-duplex operation yet.

In certain embodiments, the network signals a request that Early Indication of full-duplex UE capability is required or desired or enabled from full-duplex enhanced UE during initial access using System Information broadcast or unicast signaling. The request for Early Indication of full-duplex UE capability may be signaled standalone, e.g., independent of other features possibly requiring Early Indication. Alternatively, the request for Early Indication of a full-duplex UE capability is combined (e.g., as a combined early access indication) and signaled jointly with a request for Early Indication of another, e.g., non-full-duplex UE capability. Correspondingly, the UE transmits the Early Indication indicating its support of full-duplex UE capability using RACH msg1, RACH msg3 or RACH msgA standalone, or the Early Indication of its full-duplex UE capability is combined with Early Indication of a non-full-duplex UE capability and transmitted by the UE jointly.

Existing NR provides support for Early Indication signaling for purpose of differentiation of SSB beam(s), indication of preamble groups A/B and 4-step/2-step (e.g., Types 1 and 2) random access as by R15/16. In addition, Small Data Transmission (SDT), Coverage Enhancements (CE), RAN Slicing and Reduced Capabilities (REDCAP) are expected to support Early Indication in R17. These listed features are referred to as non-full-duplex capabilities in this disclosure.

A signaling indication that Early Indication of full-duplex UE capability is required or desired or enabled in a cell from full-duplex enhanced UE during initial access is transmitted using DL common signaling, e.g., System Information broadcast such as SIB1, or through broadcast or unicast system information messages. For example, the signaling indication can be encoded as part of an ASN.1 extensions using existing IEs, e.g., UL Common Config. One or more selected bit or index value(s) may be representative of the signalling indication associated with Early Indication of full-duplex UE capability.

A signaling indication that Early Indication of full-duplex UE capability is requested, required or enabled in a cell from a full-duplex enhanced UE during initial access may be combined with that of another non-full-duplex capability. For example, the signaling indication requesting Early Indication of full-duplex UE capability may be combined and requested jointly with that of SSB beam(s). Or the signaling indication requesting Indication of full-duplex UE capability may be requested jointly with that of Enhanced Coverage UE capability. For any combination of Early Indication(s) by UEs during initial access in the cell, e.g., the requested access purpose by the network, there is an associated set of UL resources allowing the gNB to differentiate access attempts by UEs providing an Early Indication from those used by normal UEs, e.g., UEs not providing Early Indication. For example, the combined request for Early Indication including Early Indication for purpose of full-duplex UE capability may associate that access purpose with the use of a new logical channel format, e.g., UL CCCH2, during RACH msg-3 or msgA transmissions as described in other embodiments of the disclosure. In such a case, the UL CCCH format may include information elements and signaling to distinguish particular UE capabilities as part of the Early Indication provided. For example, the UL CCCH then signals if Early Indication was provided because of full-duplex UE capability, or because of SSB beam selection or because of enhanced coverage UE capability.

The combined request for Early Indication using DL common signaling may comprise a one or more from the set of non-full-duplex UE features together with the full-duplex UE capability. The combined request may be signaled as part of a first indication associated with the selection of UE features for which Early Indication is requested or enabled in the cell, and a second indication associated with the combination of UE features to be combined in one or more access purposes. The grouped Early Indication request is associated with a set of UL resources and/or transmission formats. The associated set of UL resources or UL transmission format for a grouped Early Indication request, including indication of full-duplex UE capability may result in the selection of particular UL (e)LCID value(s), UL CCCH formats or a MAC CE associated with Early Indication of UE capabilities.

In one example, the full-duplex enhanced UE transmits an UL CCCH2 of size 64 bits to provide an Early Indication to the gNB that it supports full-duplex UE capability when a joint Early Indication is requested by the network.

The UE acquires a cell by measuring and/or detecting respective SSB(s). The UE acquires system information such as provided by the MIB, the SIB1 and/or system information messages. The UE determines random access parameters from the broadcasted or from unicast signaled system information. The UE reads SIB1 and determines that Early Indication is enabled for some, but not all possible access purposes. The gNB configures through SIB1 that if supported by the UE, Early Indication using a single access purpose is possible for full-duplex UE capability, and the non-full-duplex UE capabilities Reduced Capability (REDCAP) and Enhanced Coverage (EC) in the cell. The gNB also configures RACH msg3 based Early Indication for the grouped Early Indication. The gNB designates the UL CCCH2 transmission format of size 64 bits using an LCID index value 34. A UE not supporting full-duplex UE capability selects the UL CCCH of size 48 bits using LCID index value 52 for its RACH msg-3 transmission during initial access. The UE supporting UE full-duplex UE capability transmits UL CCCH2 and sets a payload bit for full-duplex UE capability to 1 but sets payload bits REDCAP and EC to zero. The UE transmits the selected UL CCCH or UL CCCH2 as part of the MAC payload, e.g., carrying its RRC Setup Request message. The gNB detects presence of a RACH msg3 transmission in the scheduled resources for the UE. The gNB reads the LCID. If UL CCCH using LCID index value 52 is present, no Early Indication is provided by the UE. The gNB may schedule the UE subject to legacy TDD UL-DL frame configuration constraints, e.g., subsequent UL transmissions by the UE are scheduled in normal UL slots. However, if the gNB detects an Early Indication as provided by LCID index value 52 for the UL CCCH2 with the new RRC message format from the full-duplex enhanced UE, the gNB may schedule subsequent transmissions from/to that UE by using both XDD or full-duplex slots and/or UL slots. FIG. 20 illustrates an example UE processing chain for determination of the RRC message format to transmit RACH msg3 according to the embodiment of the disclosure.

The method 2000, as illustrated in FIG. 20, describes an example UE processing chain to signal Early Indication of full-duplex UE capability in presence of grouped indications.

In step 2010, a UE (such as the UE 116) acquires SSB(s) and reads system information. In step 2020, the UE determines random access parameters from SIB1. In step 2030, the UE determines if grouped Msg-3 based Early Indication includes full-duplex UE capability is required. Upon a determination that it is not required (as determined in step 2030), the UE performs legacy RA procedure (step 2060). Alternatively, a determination that it is required (as determined in step 2030), the UE determines in step 2040 UL CCCH payload associated with grouped Early Indication. In step 2050, the UE transmits UL-SCH with UL-CCCH and resulting payload.

Although FIG. 17 illustrates the method 1700, FIG. 18 illustrates the diagram 1800, FIG. 19 illustrates the method 1900, and FIG. 20 illustrates the method 2000 various changes may be made to FIGS. 17-20. For example, while the methods 1700, 1900, and 2000 are shown as a series of steps, various steps could overlap, occur in parallel, occur in a different order, or occur multiple times. In another example, steps may be omitted or replaced by other steps. For example, the steps of the method 1700, the steps of the method 1900, and the steps of the method 2000 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
receiving a system information block (SIB1) including configuration information;
identifying, based on the configuration information, a random access channel (RACH) configuration;
identifying, based on the configuration information, whether an early access indication associated with a full-duplex operation is enabled;
determining to use a first random access transmission configuration when the early access indication is enabled or a second random access transmission configuration when the early access indication is not enabled; and
transmitting a random access message using the determined first or second random access transmission configuration.

2. The method of claim 1, wherein:
the random access message is a RACH message 3 (msg3) or a RACH message A (msgA), and
the first and second random access transmission configurations are associated with different logical channel identification (LCID) or extended (eLCID) values, respectively, for the RACH msg3 or the RACH msgA.

3. The method of claim 1, wherein:
the random access message is a RACH message 3 (msg3) or a RACH message A (msgA), and
the first and second random access transmission configurations are associated with different common control channel (CCCH) types, respectively, for the RACH msg3 or the RACH msgA.

4. The method of claim 1, wherein:
determining to use the first or second random access transmission configuration comprises determining to use the first random access transmission configuration that includes transmission of a medium access control-control channel (MAC CE) associated with the early access indication of the full-duplex operation, and
transmitting the random access message further comprises transmitting a RACH message 5 (msg5) including the MAC CE associated with the early access indication of the full-duplex operation, or
the method further comprises transmitting a physical uplink shared channel (PUSCH) including the MAC CE associated with the early access indication of the full-duplex operation.

5. The method of claim 1, further comprising:
receiving a combined early access indication associated with a first type or a second type,
wherein the first type is associated with the full-duplex operation, and
wherein determining to use the first or second random access transmission configuration further comprises determining to use the first or second random access transmission configuration based on the combined early access indication,
wherein the first type corresponds to a legacy random access configuration or legacy physical RACH (PRACH) configuration index, and
wherein the second type corresponds to additional random access configuration or additional PRACH configuration index.

6. The method of claim 1, further comprising determining whether the early access indication is enabled based on reception of a subband full duplex (SBFD) configuration.

7. The method of claim 1, further comprising determining whether the early access indication is enabled based on an associated synchronization signal block (SSB).

8. A user equipment (UE), comprising:
a transceiver configured to receive a system information block (SIB1) including configuration information; and
a processor operably coupled to the transceiver, the processor configured to:
identify, based on the configuration information, a random access channel (RACH) configuration;
identify, based on the configuration information, whether an early access indication associated with a full-duplex operation is enabled;
determine to use a first random access transmission configuration when the early access indication is enabled or a second random access transmission configuration when the early access indication is not enabled,
wherein the transceiver is further configured to transmit a random access message using the determined first or second random access transmission configuration.

9. The UE of claim 8, wherein:
the random access message is a RACH message 3 (msg3) or a RACH message A (msgA), and
the first and second random access transmission configurations are associated with different logical channel identification (LCID) or extended (eLCID) values, respectively, for the RACH msg3 or the RACH msgA.

10. The UE of claim 8, wherein:
the random access message is a RACH message 3 (msg3) or a RACH message A (msgA), and
the first and second random access transmission configurations are associated with different common control channel (CCCH) types, respectively, for the RACH msg3 or the RACH msgA.

11. The UE of claim 8, wherein:
the processor is further configured to determine to use the first random access transmission configuration that includes transmission of a medium access control-control channel (MAC CE) associated with the early access indication of the full-duplex operation, and
the transceiver is further configured to:
  transmit the random access message as a RACH message 5 (msg5) including the MAC CE associated with the early access indication of the full-duplex operation, or
  transmit a physical uplink shared channel (PUSCH) including the MAC CE associated with the early access indication of the full-duplex operation.

12. The UE of claim 8, wherein:
the transceiver is further configured to receive a combined early access indication associated with a first type or a second type,
the first type is associated with the full-duplex operation,
the processor is further configured to determine to use the first or second random access transmission configuration based on the combined early access indication,
the first type corresponds to a legacy random access configuration or legacy physical RACH (PRACH) configuration index, and
the second type corresponds to additional random access configuration or additional PRACH configuration index.

13. The UE of claim 8, wherein the processor is further configured to determine whether the early access indication is enabled based on reception of a subband full duplex (SBFD) configuration.

14. The UE of claim 8, wherein the processor is further configured to determine whether the early access indication is enabled based on an associated synchronization signal block (SSB).

15. A base station (BS) comprising:
a transceiver configured to:
  transmit a system information block (SIB1) including configuration information indicating a random access channel (RACH) configuration and an early access indication associated with a full-duplex operation; and
  receive a random access message using a first or second random access reception configuration,
wherein the first random access reception configuration is used when the early access indication is enabled and the second random access reception configuration is used when the early access indication is not enabled.

16. The BS of claim 15, wherein:
the random access message is a RACH message 3 (msg3) or a RACH message A (msgA), and
the first and second random access reception configurations are associated with different logical channel identification (LCID) or extended (eLCID) values, respectively, for the RACH msg3 or the RACH msgA.

17. The BS of claim 15, wherein:
the random access message is a RACH message 3 (msg3) or a RACH message A (msgA), and
the first and second random access reception configurations are associated with different common control channel (CCCH) types, respectively, for the RACH msg3 or the RACH msgA.

18. The BS of claim 15, wherein:
use of the first random access reception configuration includes reception of a medium access control-control channel (MAC CE) associated with the early access indication of the full-duplex operation, and
the transceiver is further configured to:
  receive the random access message as a RACH message 5 (msg5) including the MAC CE associated with the early access indication of the full-duplex operation, or
  receive a physical uplink shared channel (PUSCH) including the MAC CE associated with the early access indication of the full-duplex operation.

19. The BS of claim 15, wherein:
the transceiver is further configured to transmit a combined early access indication associated with a first type or a second type,
the first type is associated with the full-duplex operation, and
the first or second random access reception configuration is used based on the combined early access indication,
wherein the first type corresponds to a legacy random access configuration or legacy physical RACH (PRACH) configuration index, and
wherein the second type corresponds to additional random access configuration or additional PRACH configuration index.

20. The BS of claim 15, wherein whether the early access indication is enabled based on transmission of a subband full duplex (SBFD) configuration.

* * * * *